(12) United States Patent
Merz et al.

(10) Patent No.: US 7,331,750 B2
(45) Date of Patent: Feb. 19, 2008

(54) PARALLEL ROBOT

(76) Inventors: Michael Merz, Tannenstr 41, Swisttal (DE) 53913; Shambhu Nath Roy, 101 E. Mallard Dr. #273, Boise, ID (US) 83706

( * ) Notice: Subject to any disclaimer, the term of this patent is extended or adjusted under 35 U.S.C. 154(b) by 66 days.

(21) Appl. No.: 11/084,829

(22) Filed: Mar. 21, 2005

(65) Prior Publication Data
US 2006/0245894 A1 Nov. 2, 2006

(51) Int. Cl.
*B22J 18/00* (2006.01)
(52) U.S. Cl. ............... 414/735; 74/490.01; 74/490.05; 414/901; 901/8; 901/15
(58) Field of Classification Search ........... 414/680, 414/735, 729, 917; 74/490.01, 490.05; 901/8, 901/15
See application file for complete search history.

(56) References Cited

U.S. PATENT DOCUMENTS

| | | | |
|---|---|---|---|
| 3,995,746 A * | 12/1976 | Usagida ............... | 414/738 |
| 4,065,001 A * | 12/1977 | Ohnaka ............... | 414/733 |
| 4,407,625 A | 10/1983 | Shum | |
| 4,946,337 A | 8/1990 | Tonai | |
| 4,976,582 A | 12/1990 | Clavel | |
| 5,539,291 A | 7/1996 | Reboulet | |
| 5,725,352 A | 3/1998 | Tanaka | |
| 5,857,826 A | 1/1999 | Sato | |
| 6,497,548 B1 | 12/2002 | Roy et al. | |
| 6,516,681 B1 | 2/2003 | Pierrot | |
| 6,602,042 B2 | 8/2003 | Roy et al. | |
| 6,648,583 B1 | 11/2003 | Roy et al. | |
| 2004/0013509 A1* | 1/2004 | Roy et al. ............... | 414/735 |
| 2004/0211284 A1 | 10/2004 | Roy et al. | |

\* cited by examiner

*Primary Examiner*—Donald Underwood

(57) ABSTRACT

A parallel robot or parallel kinematics mechanism is provided for uses such as robotics or machining. The mechanism comprises a fixed base, a main arm, and a first and second support arm to position and orient an object in a cylindrical space with at least three degrees of freedom and retained inclination. The main arm includes an end component for supporting the object and linkage means to retain the inclination of the end component with respect to the base for all positions and orientations of the end component. The mechanism advantageously provides a large cylindrical workspace and a small footprint and is capable of moving an object at high accelerations and speeds. The mechanism can be equipped with an additional motor to orient an object, thereby providing the mobility of a SCARA robot. Alternatively, it can be equipped with passive transmission means that allow for an object to be displaced in parallel to itself.

15 Claims, 11 Drawing Sheets

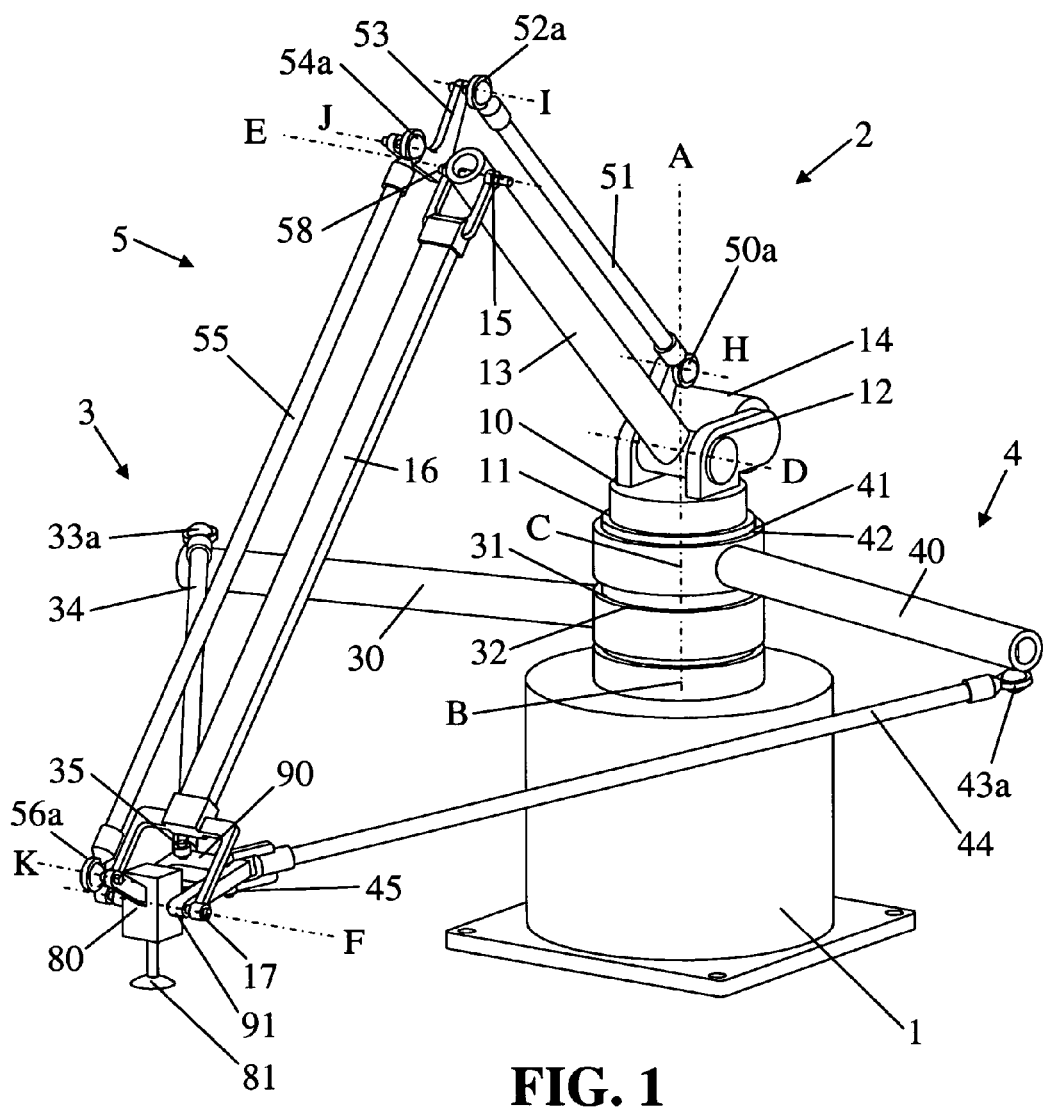
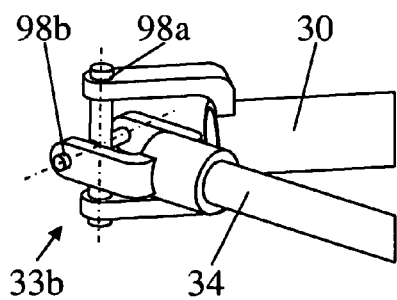
FIG. 2
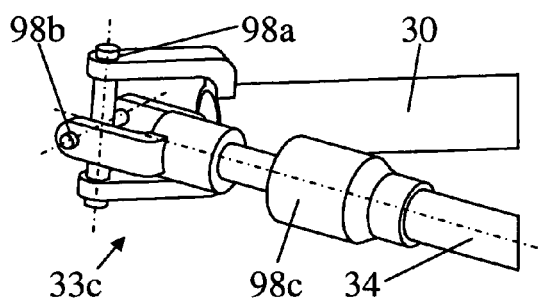
FIG. 3

PARALLEL ROBOT

BACKGROUND

The present invention generally relates to an apparatus with multiple actuated arms arranged in parallel for positioning and orienting an object in space with at least three degrees of freedom and retained inclination.

A need exists for simple and effective parallel robots, also known as parallel kinematics mechanisms. In general, robots are used in applications such as handling, assembling, positioning, picking and placing, packaging, palletizing, measuring, machining, and so on. Robots can be classified as serial or parallel. Serial robots, or serial kinematics mechanisms, are widely used and presently dominate the market.

A serial robot has a series of cantilever beams that are movably connected together in an end-to-end fashion by actuated prismatic or revolute joints, forming an open loop. When a serial robot is subjected to loading, the position of the farthest member, i.e., the end-effector, is subject to the cumulative deflections of all serial members. Since forces acting on the farthest member cause unfavorable bending and torsional moments in all serial members and therefore large deflections, the positioning error of the end-effector is significant. To improve the accuracy and stiffness of a serial robot, its members are designed to be rigid. However, this also increases the moving mass or inertia of the mechanism and causes a bulky design as well as a poor stiffness-to-mass and payload-to-mass ratio. Moreover, actuators of a serial robot are typically required to be mounted close to the joints along the serial chain and further increase the moving mass of the structure. As a result, the acceleration capability of serial mechanisms is limited, causing longer cycle and settling times in robotics applications.

A well-known mechanism of the serial type is the so-called SCARA robot, which includes three actuated revolute joints with parallel axes of rotation and one actuated prismatic joint. The device is able to position and orient an object in a cylindrical workspace with three translational degrees of freedom (x, y, z) and one rotational degree of freedom (rotation about z, i.e. the orientation), hence referred to as SCARA mobility. The inclination of the object, i.e. its rotation about axes x and y, remains constant with respect to the robot base for all poses of the mechanism. The fixed inclination makes this type of mechanism suitable for a wide range of industrial applications, such as handling, picking and placing, packaging or assembling. Another feature of the mechanism is that the axes of the actuated revolute joints are typically arranged in parallel to the direction of gravitational forces, such that the robot can be positioned manually in the x-y-plane by an operator, without any actuators or brakes engaged. This is useful when teaching the robot or resetting after a collision with the environment. Being a serial structure, however, a SCARA robot suffers from a poor stiffness-to-mass and payload-to-mass ratio, low natural frequencies and a limited speed and acceleration performance. Therefore, a need exists for a robot, which allows objects to be displaced in space with three or four degrees of freedom and retained inclination, and which provides high acceleration performance in combination with a light, rigid design and accurate positioning capability. A need also exists for such a robot to remain stationary under the influence of gravity and thus allow for manual positioning by an operator.

Relative to serial robots, parallel robots typically have an improved stiffness-to-mass and payload-to-mass ratio, better accuracy, superior dynamic properties and can move at higher speeds and accelerations. A parallel robot or mechanism has a plurality of links that form one or more closed loops, the links thereby sharing the load on the end-effector. Links of such a mechanism typically experience mostly compression or pulling forces, allowing the use of cheaper, lighter, and simpler material. Moreover, positioning errors of actuators are typically divided, thereby resulting in a high accuracy of the end-effector. In addition, actuators of parallel robots are often times mounted on or close to the base, which reduces the moving mass and allows for high end-effector accelerations. It also facilitates an easier design and an inexpensive integration of the actuators into the robot. Examples of parallel robots are illustrated in U.S. Pat. Nos. 6,497,548, 6,602,042, 6,648,583, and U.S. Patent Application 2004/0211284.

Further mechanisms of the parallel type have been presented, for example, in U.S. Pat. Nos. 4,976,582 and 6,516,681. Both devices provide SCARA mobility. Due to the rotationally symmetric arm arrangement of both devices, the workspace is relatively small. Moreover, as a result of the required suspension from a truss, the devices need significantly more floor space compared to traditional mechanisms such as SCARA robots, leading to a poor workspace-to-footprint ratio. The suspended mounting presents several further disadvantages: The truss needs to be rigid enough to prevent vibrations, which would impair the positioning accuracy of the end-effector. This causes additional cost and a bulky design. Furthermore, maintenance and repair work is more difficult than in traditional serial mechanisms, and the robot needs to be well-sealed to avoid contamination of underlying work pieces or conveyor belts. Devices of the aforementioned disclosures also do not allow for manual positioning as they collapse under the influence of gravity.

To reduce the footprint of parallel robots and avoid the disadvantageous suspension from a truss, alternative designs have been proposed. For example, the manipulator presented in U.S. Pat. No. 5,539,291 employs three arms interposed between a base and a moving element to displace an object in a cylindrical workspace with three degrees of freedom. Two arms operate in a horizontal plane and determine the radial distance and orientation of the moving element via a connecting rod and an attitude transmission member, which keeps the moving element at a fixed inclination with respect to the base. The third arm operates in a vertical plane and influences the axial position of the moving element in the cylindrical workspace. The functional association of the attitude transmission members with the connecting rods of the first two arms leads to a complicated and fragile design: In particular, the disclosed implementation with two opposing wheels and a cable is not only undesirable in terms of manufacturing cost and assembling, but also reduces the accuracy and rigidity of the mechanism. The mechanism is also not able to independently orient an object, i.e. rotate it about a vertical axis (z). The robot also collapses under the influence of gravity.

To simplify the design, alternative mechanisms similar to the one presented in U.S. Pat. No. 5,539,291 have been disclosed. For example, WO 02/22320 shows a manipulator to move an object in space with three arms. Two arms are mounted on a central column and rotatably actuated to move in horizontal planes while the third arm is actuated to operate in a vertical plane. Links connect the arms to the end-effector via joints, which lie on a common line of symmetry. This type of joint arrangement requires a lot of space at the end-effector and complicates its design. Moreover, it is not possible to place additional components such as work tools or actuators on the line of symmetry and close to the joints. This, however, would be desirable to reduce the moment of inertia about the line of symmetry. In one of the disclosed embodiments, the actuator of the third arm is mounted on and rotated by one of the other arms, causing additional inertia and asymmetric torque loads for the two arms. Whenever the end-effector is either at a great distance from or in close proximity to the central column, such an arrangement places the third arm in an unfavorable, asymmetric position relative to the other two arms and causes undesirable asymmetric stiffness, accuracy, and acceleration characteristics.

WO 02/058895 discloses a similar manipulator, which includes an additional linkage connecting the movements of the three arms such that the third arm remains in the middle between the other two arms. This results in an improved workspace-to-footprint ratio, which is comparable to that of serial robots of the SCARA-type. In both of the aforementioned disclosures, joints with three degrees of freedom such as ball-and-socket joints are used to connect links to the arms and to the end-effector. This, however, is not desirable in many applications due to backlash in the joints, friction and rapid wear. Joints must be manufactured with great precision in order to not impair the positioning accuracy of the end-effector. Moreover, precise ball-and-socket joints are expensive. A design with joints providing three degrees of freedom each also requires a large number of degrees of freedom of the passive joints per degree of freedom provided at the end-effector, leading to additional cost, weight, and inaccuracies. A solution for this particular disadvantage has been presented in U.S. Patent Application 2004/0211284.

Furthermore, mechanisms according to WO 02/22320 or WO 02/058895 include five, six, or even more links between the arms and the end-effector in order to transmit forces as well as moments acting on the end-effector via pure compression or pulling forces in the links. This increases the volume occupied by the mechanism and bears the risk of interferences between the links and other objects in proximity to the mechanism. Moreover, a high number of links is not needed particularly when external or inertial forces act on the end-effector at a point that is close by the longitudinal axes of the links. In such a case, said forces only cause small torsional or bending loads, which can easily be taken by the links. A lower number of links also reduces the weight and the number of required joints, which improves accuracy and saves cost of passive joints as well as links.

The described disadvantage also applies to the parallel mechanism disclosed in WO 03/066289. The device for positioning and orienting an object in space with at least three degrees of freedom comprises three arms, which rotate about the same axis and are driven by base-mounted actuators. Two of the arms control the position of the object in a horizontal plane normal to the axis, while the third arm influences its vertical position. Similar to SCARA robots, the inclination of the object can be kept constant. The coaxial arm arrangement, however, requires the circular, horizontal motion of the third arm to be translated into a vertical motion of the object, which is undesirable from a kinematics point of view: The velocity transmission ratio will vary significantly depending on the arm position and, along with the overall asymmetric arrangement, causes uneven and asymmetric stiffness, accuracy, and acceleration characteristics at the end-effector. Mechanisms of the disclosure also collapse under the influence of gravity, and thus do not allow for manual positioning by an operator.

Other parallel robots with coaxial arm arrangements have been proposed, for example in U.S. Pat. Nos. 4,946,337, 5,725,352 and 5,857,826. Manipulators of these disclosures have small footprints and retain the inclination of the end-effector, but do not allow for an axial displacement or an orientation of the supported object. Thus, they cannot replace traditional SCARA robots. However, a robot according to U.S. Pat. No. 5,857,826 always keeps the end-effector radially oriented, which is particularly useful in wafer handling applications. Another parallel mechanism with a small footprint has been presented in U.S. Pat. No. 4,407,625. The device comprises at least three arms and allows for an object to be displaced with at least three degrees of freedom. However, the inclination of the end-effector does not remain constant and the workspace is small compared to the entire robot volume.

Another major concern in many robotics applications and traditional robots is cable management. To connect various utilities such as power, sensors, or air pressure, utility lines must be routed along the moving serial structure of the mechanism, exposing such lines to significant stress and wear. To ensure operational reliability, custom-made power or utility lines are required, causing considerable extra cost.

Another concern particularly with existing serial mechanisms, such as SCARA or articulated robots, is the lack of scalability and modularity. To vary the output parameters, such as workspace size or shape, stiffness or accuracy characteristics, the entire serial structure including the actuators typically needs to be redesigned and replaced. Thus, serial robots do not allow for economies of scale when offered in various sizes, for example.

Therefore, a need exists for a simple and effective parallel robot for movement of an object in space with at least three or four degrees of freedom and retained inclination. A need further exists for a parallel robot that exhibits a large translational and rotational motion range of the end-effector in combination with small floor space requirements, thus resulting in a high workspace-to-footprint ratio. A need also exists to provide a fast mechanism with high acceleration capabilities and improved dynamic properties. Ideally, such a mechanism allows for the possibility to be equipped with means for compensating the influence of gravity, thus facilitating a manual positioning by an operator.

Moreover, a need exists for an accurate parallel robot that provides an improved stiffness-to-mass and payload-to-mass ratio. Ideally, stiffness, accuracy, and acceleration properties of the end-effector remain similar within the motion range of the end-effector. Furthermore, the mechanism should allow for simple cable management and improved operational reliability with reduced costs. The mechanism should also have a simple, robust, modular, and scalable design with no redundant joint freedoms as well as a low number of required links and joints to support the end-effector.

SUMMARY OF THE INVENTION

The present invention provides a parallel robot or parallel kinematics mechanism, which overcomes difficulties incurred in prior art devices by using improved and new arrangements of limbs, joints, actuators, and linkages.

An object of the invention in a first aspect is to provide a parallel robot mechanism, which allows for an object to be positioned and oriented in space with at least three degrees of freedom and retained inclination relative to the base of the mechanism. Mechanisms built in accordance with teachings of the present invention have a main arm that comprises a platform rotatably mounted to the base of the mechanism, an end component for supporting the object, and linkage means interposed between the platform and the end component. The linkage means fix or retain the inclination of the end component with respect to the platform and the base for all positions and orientations of the end component. The main arm is supported by two support arms, which are interposed between the base and the main arm. The main arm and the two support arms include actuators that actuate the respective arm to influence and determine the position and orientation of the end component in space, such that the end component can be moved with three degrees of freedom relative to the base. In an embodiment, the linkage means comprise various links, arms, and joints, which represent a planar mechanism of two parallelograms joined on one edge or sharing a link. In another embodiment, the linkage means include belts and pulleys to retain the inclination of the end component with respect to the platform.

According to an embodiment of the invention, the end component supports an object via a work tool, which can be displaced in cylindrical coordinates, i.e. the work tool always remains radially oriented. According to further embodiments, a work tool is rotatably mounted to the end component and operably linked to an additional actuator such that an object attached to the work tool can be positioned and oriented with four degrees of freedom and retained inclination, i.e. SCARA mobility. In various embodiments, the work tool, such as a gripper, sucking, or cutting device, is powered by an actuator mounted to the base. The actuator can also be mounted to the platform of the main arm or to the end component directly. Power transmission from the actuator to the work tool is achieved by a telescopic spline-shaft assembly, or a drive shaft in combination with a slider, or additional arms, or belt-and-pulley arrangements, or direct connection to the work tool. In another embodiment of this invention, a robot having a work tool rotatably mounted to the end component is equipped with passive transmission means, which retain the orientation of the end component relative to the base of the robot. In such an advantageous design, objects can be displaced in parallel to themselves.

Another object of the invention is to provide a parallel robot with a large workspace-to-footprint ratio and similar characteristics across the workspace. According to an embodiment, a main arm and two supporting arms for influencing the position and orientation of an object are advantageously arranged to rotate about a common central axis, thereby allowing the object to be positioned and oriented in a large cylindrical workspace with an angular range of 360° or more. The workspace characteristics remain the same in the angular direction of the cylindrical workspace, and similar in the axial direction. The arms are mounted to a base, which requires very little floor space due to the coaxial arrangement of the main arm and the two support arms. This results in a large workspace-to-footprint ratio, which compares to that of SCARA robots and thereby exceeds that of most commonly known parallel robots, particularly the ones suspended from trusses. In another embodiment of the invention, the main arm and the two support arms rotate about separate parallel axes, which can further simplify the design of the mechanism.

Another object of the invention is to provide a parallel robot that can achieve high end-effector accelerations and speeds. According to an embodiment of this invention, small rotations of the actuated arms of a robot are translated into large displacements of the end component and the supported object. Moreover, the actuators of the robot, e.g. rotary motors, are mounted onto or close to the base, which reduces the moving mass of the mechanism and allows for the selection of powerful and potentially heavier actuators, without having the negative effect on the dynamics as seen in serial robots. Moreover, a robot mechanism according to this invention comprises a main arm and two support arms with respective forearms. The forearms of the two support arms experience only pulling or compression forces, allowing the use of light, simple, and cheap materials such as carbon fiber tubes. This further reduces the moving mass of the mechanism. The forearm of the main arm experiences pulling or compression forces, as well as some bending during lateral motions. In an embodiment, the bending load is significantly reduced by a guiding linkage interposed between the main arm and the two support arms. The guiding linkage keeps the main arm at equal angles to the two support arms.

It is a further object of the invention to provide a robot with improved structural stiffness and accuracy. Mechanisms according to this invention comprise a parallel structure of multiple arms for supporting an end component, the arms thereby sharing the loads on the end component. This type of arm arrangement gives mechanisms of this invention truss-like behavior and a high structural stiffness. Since the forearms are mostly subjected to compression or pulling forces, mechanisms with a design according to the invention can be built in a light and cost-efficient manner and with a high stiffness-to-mass ratio, particularly in comparison to serial devices. In addition, the parallel arrangement of the arms compensates for positioning errors of the individual actuators and leads to a high positioning accuracy. According to an embodiment of this invention, a mechanism has a low number of joints of the revolute type only, the joints being made of standard ball bearings for example. In high-precision applications, such a design is not only more cost-efficient, but also more accurate compared to robots, which employ ball-joints to connect their actuated arms to the end-effector.

A further object of this invention is to provide a mechanism that allows for a modular, scalable design and simple, robust cable management. In an embodiment, a mechanism having a design according to the invention allows for extremely simple cable management by integration of most actuators into the stationary base. Other actuators are mounted on the moving structure, but close to the base. Therefore, most cables and other utility lines do not need to move or bend during operation of the robot. This improves the operational reliability particularly compared to traditional serial robots. Moreover, actuators integrated into or close to base combined with a light and inexpensive forearm structure greatly enhance the scalability of mechanisms provided by this invention. Varying the output parameters such as workspace size only requires substitution of the inexpensive forearm structure while costly actuators and base structures can be reused. This allows for a reconfigurable standard design that can be used in many applications with minimum modifications. Moreover, the support arms of mechanisms according to this invention have a similar design, allowing the reuse of components and therefore lower manufacturing and maintenance cost.

Another object of the invention is to provide a parallel robot comprising less links compared to other robots of its kind. According to an embodiment of this invention, a robot mechanism includes a main arm and two support arms for positioning and orienting an object in space with at least three degrees of freedom. The main arm includes a forearm and a belt arrangement to retain the inclination of the object, while the support arms include two forearms. Thus, a robot according to this invention can be built with only three forearms or links. In another embodiment, the belt arrangement of the main arm is replaced by a further link, resulting in a total of four links that support the object in space. The lower number of links translates into less material and manufacturing cost, less joints, and therefore more accuracy, less weight, less space requirements of the arm structure of the mechanism, and a lower risk of interferences with objects in proximity to the robot.

A further object of the invention is to provide a parallel robot that does not move under the influence of gravity and can therefore be positioned manually by an operator. According to an embodiment, a robot mechanism is equipped with elastic means that compensate gravitational forces acting on the arm structure for at least one position and orientation of the end component.

An object of this invention in a second aspect is to provide a method of moving an object in space with at least three degrees of freedom and retained inclination. The method comprises providing a mechanism with a base, a main arm including an end component for supporting the object, the main arm being rotatably mounted to the base about a central axis, and two support arms, wherein the main arm and the two support arms are equipped with actuators. The method further comprises actuating said main arm and said first and second support arm with the respective actuator to influence the position and orientation of the end component while retaining the inclination of said end component relative to said base with the main arm.

Mechanisms according to an embodiment of the invention may be useful in mechanical engineering applications for handling, assembling, positioning, picking and placing, packaging, palletizing, measuring, machining, electronic or printed circuit board assembly or integration, and other robotic tasks. Additional features and advantages of the present invention are described in, and will be apparent from, the detailed description of the preferred embodiments and from the drawings.

BRIEF DESCRIPTION OF THE DRAWINGS

The following is a description, by way of example only, of different embodiments of the mechanism, its variations, derivations, and reductions.

FIG. 1 is a perspective view of a mechanism constructed in accordance with the invention, the mechanism having a main arm and two support arms arranged to rotate about a central axis to position and orient an object in space with three degrees of freedom and retained inclination.

FIG. 2 is a perspective and detailed view of an alternative universal joint that can be used in the support arms of the embodiment of FIG. 1.

FIG. 3 is a perspective and detailed view of an alternative triple-axis revolute joint arrangement that can be used in the support arms of the embodiment of FIG. 1.

DETAILED DESCRIPTION OF THE PRESENTLY PREFERRED EMBODIMENTS

Figure 4:
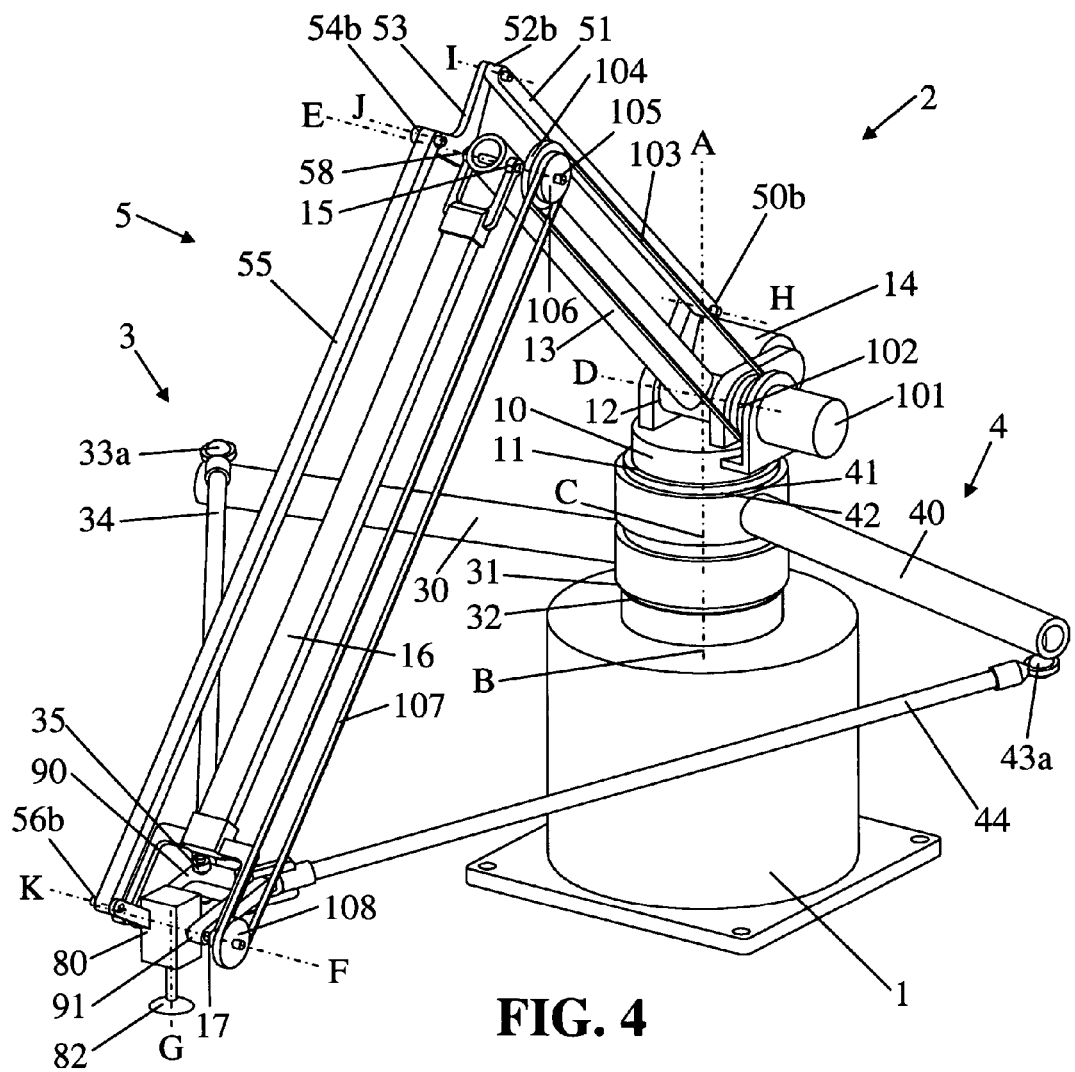
FIG. 4 is a perspective view of a mechanism similar to the embodiment of FIG. 1, the mechanism having an alternative main arm and an additional actuator for rotating a work tool to provide an additional rotational degree of freedom.

Now referring to the drawings, wherein like numerals designate like components, FIG. 1 shows a parallel robot or parallel kinematics mechanism, hence referred to by mechanism, constructed in accordance with teachings of the present invention. The mechanism includes a fixed base and is operable to position and orient an object in a cylindrical workspace with three degrees of freedom and retained inclination with respect to the base. A main arm and two supporting arms together determine the position and orientation of the object, while the main arm also retains the inclination of the object, as will be described.

As illustrated in FIG. 1, the mechanism comprises a base 1, a main arm 2, and a first and second support arm 3 and 4 interposed between the base 1 and the main arm 2. The main arm 2 includes a platform 10, an end component 80 for directly or indirectly supporting an object, and linkage means 5 interposed between the platform 10 and the end component 80. The main arm 2, or more specifically, the platform 10 is rotatably mounted to the base 1 by a revolute joint 11, allowing the platform 10 and, more generally, the main arm 2 to rotate relative to the base 1 about a central axis A.

Prior to a more detailed discussion of the linkage means 5, their overall purpose and function in the mechanism shown in FIG. 1 and other embodiments of this invention will be explained. In general, the linkage means 5 movably connect the end component 80 to the platform 10 such that the end component 80 has two translational degrees of freedom with respect to the platform 10. One of the two translational degrees of freedom of the end component 80 is influenced or controlled by an actuator, as will be described. Since the platform 10 can rotate relative to the base 1 about the central axis A, the end component 80 has three degrees of freedom relative to the base 1, one of which is actuated. In addition, linkage means 5 retain the inclination of the end component 80 relative to the platform 10 for all positions and orientations of the end component. Since the platform 10 is rotatably mounted to the base 1 about the central axis A, the inclination of the platform 10 does not change with respect to the central axis A and the base 1. Thus, the inclination of the end component 80 is also retained with respect to the central axis A and the base 1.

There are several ways to realize the abovementioned function of the linkage means 5. As shown in the embodiment of FIG. 1, a first way is to incorporate a planar mechanism that comprises two movable parallelograms connected to each other at one edge, i.e. two planar four-bar linkages with parallel opposing links, wherein one link is shared by the two four-bar linkages.

According to FIG. 1, the linkage means 5 comprise an actuator arm 13, a first link 51, and a reference link 53, which together with the platform 10 form a first parallelogram. On one end, the actuator arm 13 is rotatably connected to the platform 10 by a revolute joint 12 allowing rotation about a main actuator axis D, which is preferably arranged perpendicular to the central axis A and may intersect axis A. On the opposing end, it is rotatably connected to the reference link 53 by a revolute joint 58 about an axis E. Similarly, the first link 51 is connected to both platform 10 and reference link 53 on opposing ends by ball-and-socket joints 50a and 52a allowing at least a rotational degree of freedom about axes H and I. Preferably, the actuator arm 13 and the first link 51 are of equal length and arranged in parallel. Moreover, the axes D, E, H, and I ideally remain parallel to each other for all positions and orientations of the end component 80, as a result of which the reference link 53 can move with one translational degree of freedom relative to the platform 10 while retaining its inclination relative thereto.

The reference link 53 serves as an inclination reference for the end component 80 via a second parallelogram, which is formed by a forearm 16, a second link 55, the end component 80 and the reference link 53. As can be seen in FIG. 1, one end of forearm 16 is rotatably connected to the actuator arm 13 by a revolute joint 15 about a forearm axis E. The opposing end of forearm 16 is rotatably connected to the end component 80 by a revolute joint 17 allowing rotation about an end axis F. Similarly, the second link 55 is connected to both the reference link 53 and the end component 80 on opposing ends by ball-and-socket joints 54a and 56a allowing at least a rotational degree of freedom about axes J and K. Preferably, the forearm 16 and the second link 55 are of equal length and arranged in parallel. Moreover, the axes E, F, J, and K ideally remain parallel to each other for all poses of the mechanism, as a result of which the end component 80 can move with one translational degree of freedom relative to the reference link 53 while retaining its inclination relative thereto. Therefore, the end component 80 is movable with two translational degrees of freedom and retained inclination with respect to the platform 10.

As shown in the embodiment of FIG. 1, one of the two translational degrees of freedom of the end component 80 is influenced or controlled via an actuator 14 that actuates the main arm 2. More specifically, when instructed, the actuator 14 actuates the actuator arm 13 to rotate relative to the platform 10 about the main actuator axis D. The actuator 14 of the mechanism illustrated in FIG. 1 and other embodiments of this invention may comprise a rotary motor mounted to the platform 10 with its fixed portion and transmission such as gears or pulleys and belts to link the moving portion of the motor to the actuator arm 13. The actuator 14 may also include an actuated prismatic joint interposed between the platform 10 and the actuator 13, like a linear motor or a rack-and-pinion arrangement. The actuator 14 can alternatively be mounted on the base 1 and operably linked to the actuator arm via suitable transmission arrangements, in order to further reduce the moment of inertia of the main arm 2 about the central axis A.

As a result of the described arrangement of the main arm 2, its end component 80 has three degrees of freedom relative to the base 1 and a fixed inclination with respect to the central axis A. While one of the three degrees of freedom is influenced by the actuator 14 of the main arm 2, the remaining two degrees of freedom are influenced by the first and second support arm 3 and 4.

As illustrated in FIG. 1, the first and second support arm 3 and 4 comprise a respective actuator arm 30 and 40 rotatably connected to the base 1 by a respective revolute joint 31 and 41 allowing rotation about a first actuator axis B and a respective second actuator axis C. The actuator axes B and C may coincide with the central axis A in an embodiment of the mechanism. When instructed, respective actuators 32 and 42 actuate the support arms and cause the respective actuator arms to rotate about their actuator axes B and C. In the mechanism shown in FIG. 1 and other embodiments of this invention, the actuators 32 and 42 may include a rotary motor mounted to or integrated into the stationary base 1 with its fixed portion and a transmission such as gears, hollow shafts, or pulleys and belts to operably link the moving portion of the motor to the actuator arms 30 and 40. Linear motors or a rack-and-pinion arrangement can also be used. Actuation can alternatively be achieved via base-mounted or integrated direct drives or other devices generally known in the art. Such a base-mounted or integrated actuation arrangement facilitates simple and cost-efficient cable management as the utility lines or cables remain stationary. Moreover, it reduces the moving mass of the mechanism and enhances the modularity and thereby the scalability of mechanisms built in accordance with this invention, since the same actuation can be used for mechanisms with different arm sizes.

The support arms 3 and 4 further comprise a forearm 34 and 44, which are movably connected to the outer end of the respective actuator arm via a ball-and-socket joint 33a and 43a. The ball-and-socket joints allow the forearms 34 and 44 to pivot relative to their actuator arm about a respective pivot point, i.e. the center of rotation of the ball-and-socket joints. The pivot points of both ball-and-socket joints 33a and 43a preferably remain in a plane normal to the central axis A for all positions and orientations of the end component 80. As will be apparent to those skilled in the art, the pivotable connection between actuator arm and forearm can alternatively be achieved by a universal joint or a triple-axis revolute joint arrangement as shown in FIGS. 2 and 3. In FIG. 2, the actuator arm 30 of the first support arm 3 is connected to the forearm 34 by a universal joint 33b comprising two revolute joints 98a and 98b with intersecting axes of rotation. In FIG. 3, the actuator arm 30 is connected to the forearm 34 by a triple-axis revolute joint arrangement 33c, which includes three revolute joints 98a, 98b, and 98c with intersecting axes of rotations. The triple-axis joint arrangement illustrated in FIG. 3 is functionally comparable to the ball-and-socket joint 33a in FIG. 1, allowing the forearm 34 to pivot relative to the actuator arm 30 and independently rotate about its longitudinal axis. The universal joint 33b shown in FIG. 2 does not allow such an independent rotation. The joint arrangements shown in FIGS. 2 and 3 can also replace the ball-and-socket joint 43a of the second support arm 4.

Referring back to FIG. 1, the forearms 34 and 44 of the support arms 3 and 4 are movably connected to the main arm 2, so as to influence or control the above-mentioned remaining two degrees of freedom of the end component 80 by their actuators 32 and 42. There exist multiple ways of implementing such a movable connection, depending on the physical location, type, and sequence of joints. For example, the forearms 34 and 44 of the support arms 3 and 4 can be connected to the forearm 16, or the end component 80, or the second link 55, which are all part of the main arm 2. Moreover, the forearms 34 and 44 may be directly connected to the main arm 2 by individual joints, such as universal or ball-and-socket joints. Alternatively, they can be indirectly connected to the main arm 2 via intermediate elements and share certain joints, as will be described. While some of these movable connections will be described in conjunction with the various embodiments of this invention, it should be understood that the invention is not limited to the embodiments shown herein.

According to FIG. 1, the movable connection between the forearms 34 and 44 and the main arm 2 has been achieved by an intermediate element 90, to which the forearms 34 and 44 are each connected via respective revolute joints 35 and 45. The axes of rotation of the revolute joints 35 and 45 are preferably parallel to each other or may coincide, as will be described. The intermediate element 90 is further connected to the end component 80 of main arm 2 by a revolute joint 91, whose axis of rotation is preferably parallel to the end axis F or, as illustrated in FIG. 1, coincident with axis F. The above-described arrangement with the intermediate element 90 helps to reduce the number of joints and joint freedoms employed in the mechanism. It thereby reduces the weight and cost of the mechanism. It also allows to reduce torsional or bending loads on the forearm 16 of the main arm 2: By adjusting the radial and lateral offset of the revolute joints 35 and 45 relative to the end component 80, the longitudinal axes of the forearms 34 and 44 can be made to pass close by the center of gravity of the end component. Thus, the forearm 16 can be relieved from torsional or bending loads caused by longitudinal forces in the forearms 34 and 44 during high accelerations of the end component 80.

As a result of the described arrangement of the main arm 2 and the support arms 3 and 4, the position and orientation of the end component 80 relative to the base 1 is influenced and determined by the three actuators 14, 32, and 42, while its inclination is retained by the linkage means 5 and thereby the main arm 2. Since the main arm 2 and the support arms 3 and 4 can rotate about the same central axis A, the end component 80 can be displaced in a cylindrical workspace centered on axis A. While the actuator 14 of main arm 2 predominantly influences the axial position of the end component 80, the actuator 32 and 42 of the support arms 3 and 4 mostly influence the radial and angular position of the end component 80. Moreover, the support arms 3 and 4 also determine the angular position of the main arm 2, which, by itself, is free to rotate about the central axis A. However, due to the preferred parallel arrangement of the axes D, E, and F, the main arm 2 is forced to remain in a plane, which is normal to these axes and passes through the central axis A. If the first and second support arms 3 and 4 are of equal dimensions, as is preferred, the main arm 2 will always be urged to remain midway between the two support arms when viewed from the top of the mechanism. Also, the end component 80 of the main arm 2 will always be radially oriented, which is very useful in applications that require motion in cylindrical coordinates, like a semiconductor wafer transfer robot for example. In the described arrangement, it is possible to rotate the support arms 3 and 4 and the main arm 2 and thereby its end component 80 about the central axis A in a rigid-body fashion by a full 360 degrees or multiples of 360 degrees, without any relative motion between the main arm 2 and the support arms 3 and 4. Therefore, the mechanism illustrated in FIG. 1 has a large cylindrical workspace for end component 80, a small footprint of the base 1, and a workspace-to-footprint ratio similar to that of SCARA robots.

Mechanisms according to FIG. 1 and other embodiments of this invention can be built in a modular, scalable, and cost-efficient way. For example, the workspace reachable by the end component 80 can easily be varied by changing one or more of the lengths of the actuator arms 13, 30, and 40 or the forearms 16, 34, and 44, while maintaining the remaining structure of the mechanism such as the actuators or joints. In addition, mechanisms such as the one shown in FIG. 1 achieve high accelerations of the end component since small rotations of the actuator arms are translated into large displacements of the end component. Furthermore, as the forearms of the mechanism mostly experience pulling and pushing forces, they can be built with cheap and light material. This does not only reduce the cost of the mechanism, but also decreases the moving mass and inertia of the mechanism and thereby allows high accelerations and speeds of the end component.

The end component 80 is generally able to directly or indirectly support an object. This support can be achieved, for example, via an end-effector or work tool 81, which is mounted on the end component 80 as shown in FIG. 1. The work tool can be a gripper, suction head, pickup tool, welding device, drill or milling device, cutting tool, press element, wafer chuck, sensor or any other kind of end-effector.

Included in the concept of this invention is that the mechanism shown in FIG. 1, and other mechanisms described herein, may be controlled by one or more computers or other controlling devices (not shown). The computer is operable to controllably move the mechanism and thereby an object supported by the end component, and it can instruct the actuators to actuate the main arm and the two support arms to influence the position and orientation of the end component and the object in a desired manner. In a generally known manner, the computer may also receive various feedback inputs, which indicate the position and status of the mechanism, such as signals transmitted from sensors located at the respective actuators. From this position information, the computer can then calculate the position and orientation of the work tool or the supported object, as is generally known in the art.

Figure 14:
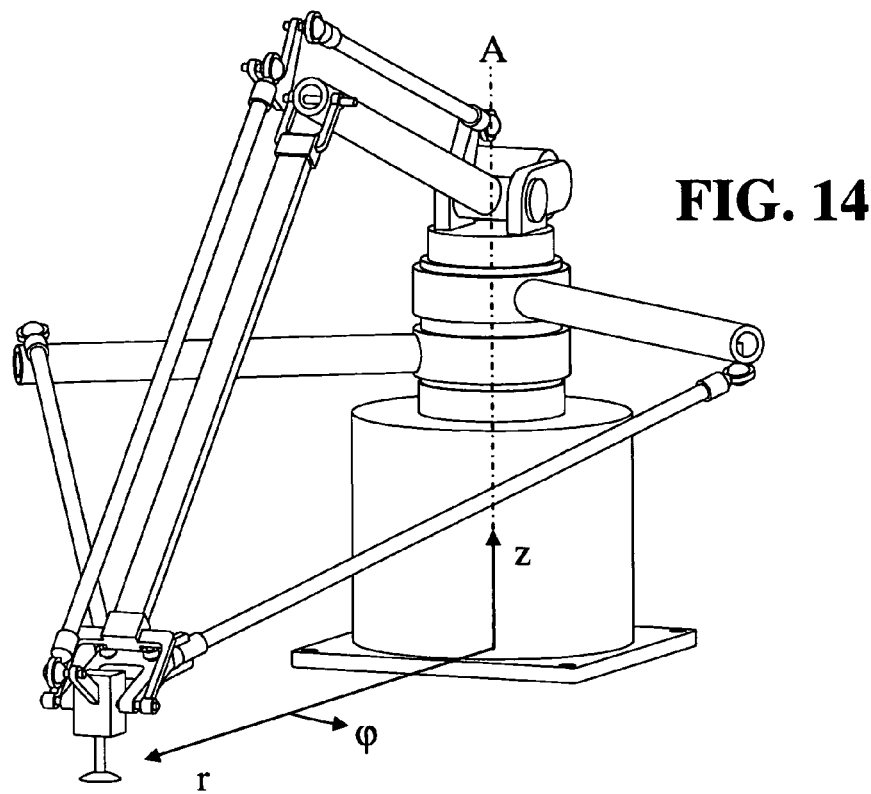
FIG. 14 is a perspective view of the mechanism shown in the embodiment of FIG. 1, the main arm of the mechanism being stretched out.
Figure 15:
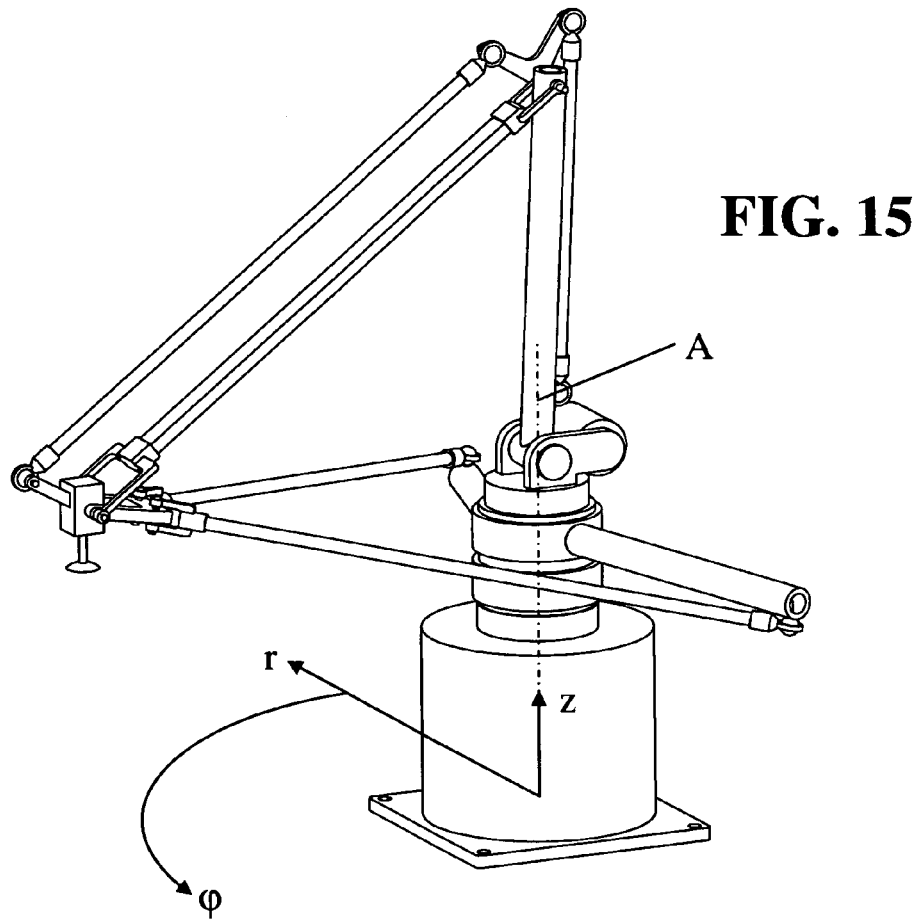
FIG. 15 is a perspective view of the mechanism shown in the embodiment of FIG. 1, the main arm of the mechanism being folded and close to the base.

FIGS. 14 and 15 show two alternative postures of the mechanism illustrated in the embodiment of FIG. 1. In FIG. 14, the end component is moved to a distant radial position and a low position along the z-axis. In FIG. 15, the end component is rotated counter-clockwise about the central axis A, raised along the z-axis, and brought closer to the central axis A of the mechanism.

Referring now to FIG. 4, another parallel robot or mechanism constructed in accordance with teachings of the present invention, for positioning and orienting an object in space with four degrees of freedom and retained inclination is shown. The mechanism is similar to the embodiment of FIG. 1, except that it is equipped with an alternative main arm and an additional actuator mounted to the platform of the main arm to rotationally drive a work tool, which is supported by the end component.

As illustrated in FIG. 4, the main arm 2 includes linkage means 5, which retain the inclination of the end component 80 relative to the platform 10 by a planar mechanism that comprises two parallelograms linked to each other, as previously discussed. In contrast to the embodiment of FIG. 1, the first link 51 is connected to the platform 10 by a revolute joint 50*b* and to the reference link 53 by a revolute joint 52*b*. The revolute joints 50*b* and 52*b* allow rotation about respective axes H and I, which are preferably arranged in parallel to the main actuator axis D and the forearm axis E. Similarly, the second link 55 is connected to the reference link 53 by a revolute joint 54*b* and to the end component 80 by a revolute joint 56*b*. The revolute joints 54*b* and 56*b* allow rotation about respective axes J and K, which are preferably arranged in parallel to the forearm axis E and the end axis F. It should be understood that the revolute joints 50*b*, 52*b*, 54*b*, and 56*b* can similarly be replaced by universal joints without affecting the working of the linkage means 5.

Moreover, the mechanism illustrated in FIG. 4 comprises a work tool actuator 101 mounted to the platform 10 by its fixed portion and operably linked to a work tool 82, which is movably connected to and able to rotate relative to the end component 80 about a work tool axis G. Preferably, the work tool axis G is parallel to the central axis A, such that its inclination relative to the base remains fixed for all positions and orientations of the end component 80. In such a case, the mechanism provides three translational degrees of freedom (x, y, z) and one rotational degree of freedom (orientation about work tool axis G which is parallel to z) to an object supported by the work tool 82, i.e. SCARA mobility.

Figure 5:
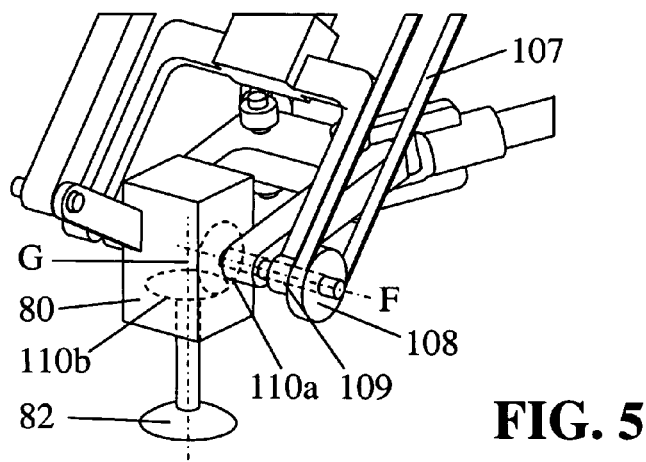
FIG. 5 is a perspective and detailed view of the work tool of the embodiment of FIG. 4, illustrating a gear arrangement that transmits rotation to the work tool.

As illustrated in FIG. 4, the work tool actuator 101, preferably of the rotary type, is operably linked to the work tool 82 by an arrangement of belts and pulleys. Actuator 101 has a main pulley 102 mounted on its moving portion to rotationally drive a first intermediate pulley 104 by a belt 103. The first intermediate pulley 104 is mounted on a shaft 105, which is rotatably connected to the actuator arm 13 allowing rotation about an axis that coincides with the forearm axis E. A second intermediate pulley 106 is mounted to the same shaft 105 to transmit the rotation of the shaft 105 to an end pulley 108 via a belt 107. The end pulley 108 is rotatably connected to the end component 80 allowing rotation about an axis that coincides with the end axis F. As illustrated in greater detail in FIG. 5, the rotation of the end pulley 108 is transmitted to the work tool 82 via a gear arrangement. More specifically, the end pulley 108 is mounted on a shaft 109, that transmits the rotation to a first gear 110*a*. The first gear 110*a* drives a second gear 110*b*, which is fixedly connected to the work tool 82 and arranged at a 90° angle to the first gear 110*a*.

Included in the concept of this invention are various modifications of the operable linkage between the work tool actuator 101 and the work tool 82. For example, the 90° gear arrangement inside the end component 80 can be replaced by any other transmission that transmits rotation between the shaft 109 and the work tool 82, such as worm gears or belt drives or the like. In addition, the work tool actuator 101 might include a reduction gear. Moreover, the belts and pulleys could be replaced by wheels and wires or a link arrangement in order to transmit motion from the work tool actuator 101 to the work tool 82. Alternatively, it is possible to use shafts arranged in parallel to the actuator arm and the forearm, with bevel gears on each end to transmit rotation from the work tool actuator 101 to the work tool 82.

Figure 22:
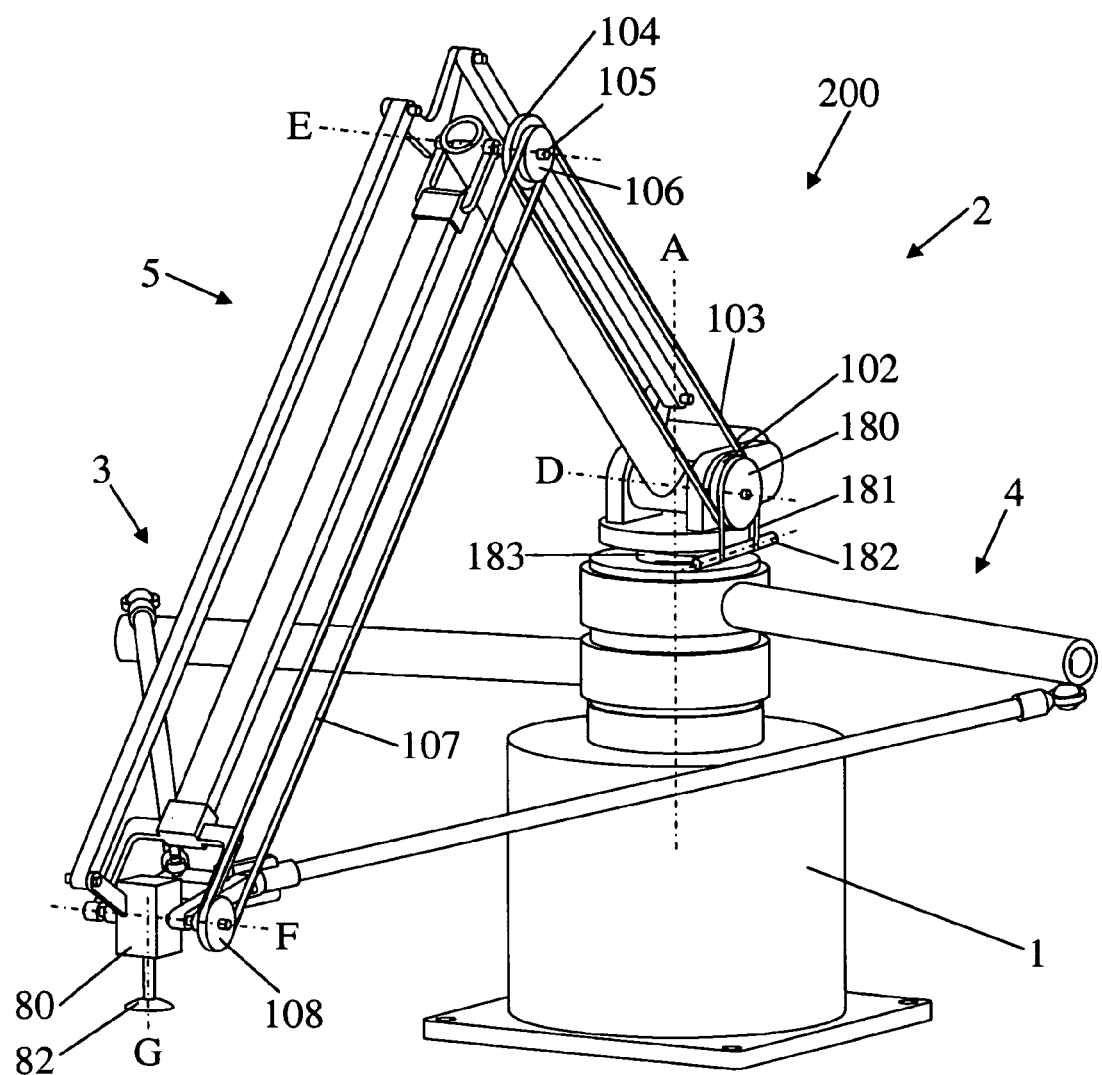
FIG. 22 is a perspective view of a mechanism similar to the embodiment of FIG. 1, the mechanism having alternative transmission means for retaining the orientation of a work tool with respect to the base.

Turning now to FIG. 22, a mechanism for positioning an object with three translational degrees of freedom is shown. The mechanism is similar to the embodiment of FIG. 4, except that it is equipped with passive transmission means 200, rather than a work tool actuator 101, which retain the orientation of the work tool 82 about its work tool axis G relative to the base. The transmission means 200 are interposed between the work tool 82 and the base 1, as will be described. As shown in FIG. 22, the main pulley 102 is rigidly connected to a coaxial pulley 180 and rotatably connected to the platform 10 about the main actuator axis D. The pulley 180 is linked to an equally sized base pulley 183 by a belt 181 and a roller 182 connected to the platform 10. The roller 182 allows for the belt 181 to change direction, so as to operably link the pulleys 180 and 183, whose axes of rotation are perpendicular to each other. The axis of the base pulley 183 is preferably aligned with the central axis A. When the platform 10 rotates relative to the base, the pulley 180 is urged to rotate as well. This rotation is then transmitted to the main pulley 102 and to the work tool 82, as described in conjunction with FIG. 4. Therefore, the transmission means 200, comprising components 180-183 as well as the belt-and-pulley arrangement 102-108 mounted on the main arm 2, retain the orientation of the work tool 82 about the work tool axis G relative to the base 1 for all positions of the end component 80. A mechanism with such transmission means 200 can advantageously displace an object attached to the work tool 82 in parallel to itself, which is required by many industrial applications. Included in the concept are alternative designs of the transmission means previously described. For example, the belt-and-pulley arrangement 180-183 could be replaced by bevel gears.

Figure 7:
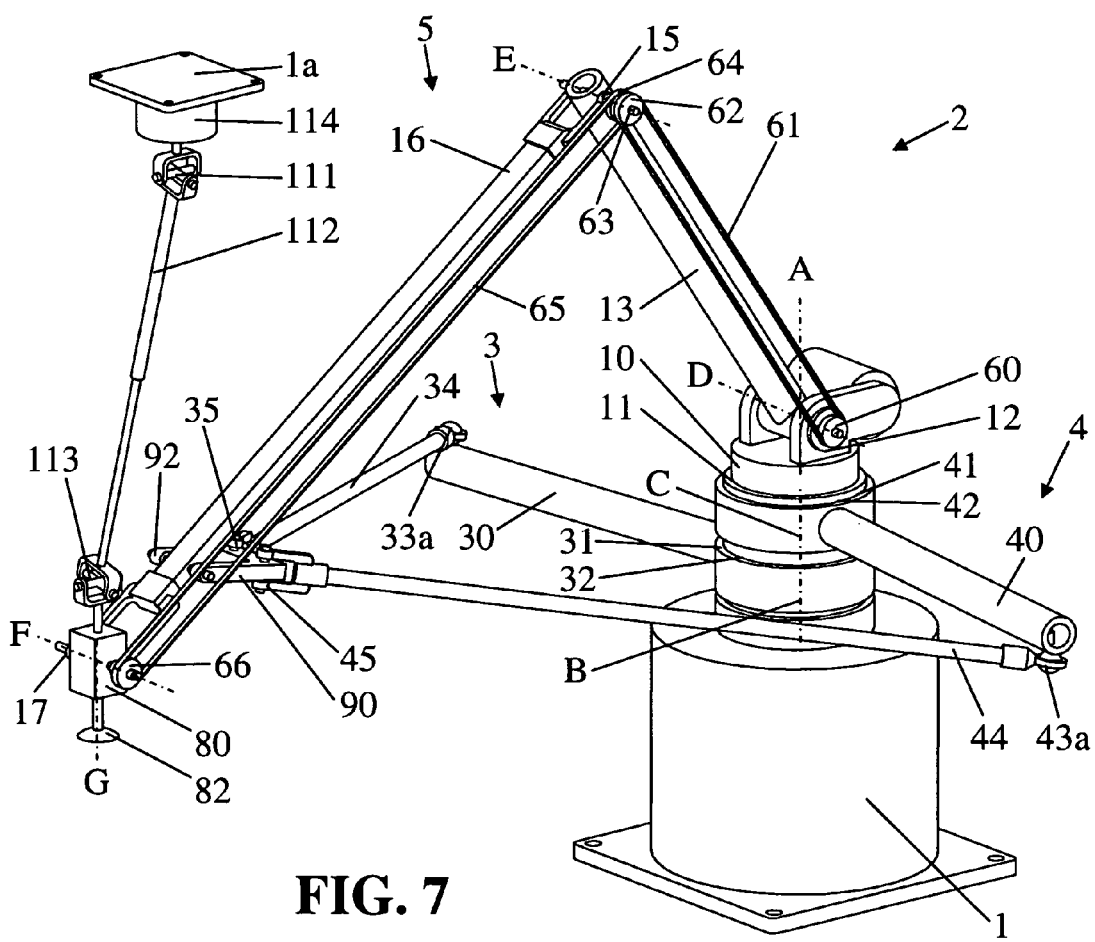
FIG. 7 is a perspective view of a mechanism similar to the embodiment of FIG. 1, the mechanism having an alternative main arm and a base-mounted motor for rotating a work tool to provide an additional rotational degree of freedom.

Referring now to FIG. 7, another parallel robot or mechanism constructed in accordance with teachings of the present invention, for positioning and orienting an object in space with four degrees of freedom and retained inclination is shown. The mechanism is similar to the embodiment of FIG. 1, except that the mechanism is equipped with an alternative main arm and an additional actuator mounted to the base to rotationally drive a work tool, which is supported by the end component.

As illustrated in FIG. 7, the main arm 2 includes linkage means 5 to retain the inclination of the end component 80 relative to the platform 10. The linkage means 5 comprise an actuator arm 13, a forearm 16, and a belt-and-pulley arrangement. As described in conjunction with FIG. 1, the actuator arm 13 is connected to the platform 10 by a revolute joint 12 and to the forearm 16 by a revolute joint 15, allowing rotation about a respective main actuator axis D and a forearm axis E. The forearm 16 is further connected to the end component 80 by a revolute joint 17 allowing rotation about an end axis F. The belt-and-pulley arrangement comprises various belts and pulleys, which transmit the inclination of the platform 10 to the end component 80 for all positions and orientations of the end component 80. Thus, the arrangement serves the same purpose as the planar mechanism with the two parallelograms, as described in conjunction with previous embodiments.

More specifically, as shown in FIG. 7, a first pulley 60 is rigidly connected to the platform 10 and centered on the main actuator axis D. A second pulley 62 with the same, preferably circular circumferential shape as the first pulley 60 is mounted on a shaft 63, which is rotatably connected to the actuator arm 13 and centered on the forearm axis E. Alternatively, the shaft 63 could rotatably be connected the forearm 13 about axis E. A belt 61 operably links the first pulley 60 to the second pulley 62, so that the angular orientation of the second pulley 62 (its inclination) remains fixed with respect to the first pulley 60 and thereby the platform 10. As shown in FIG. 7, a third pulley 64 is mounted on the shaft 63 and fixedly connected to the second pulley 62 while a fourth pulley 66 is rigidly connected to the end component 80 and centered on the end axis F. The fourth pulley 66 has the same, preferably circular circumferential shape as the third pulley 64. A second belt 65 operably links the third pulley 64 to the fourth pulley 66, so that the inclination of the fourth pulley 66 remains fixed with respect to the third pulley 64. Thus, the inclination of the end component 80 relative to the platform 10 is retained for all its positions and orientations. It should be understood that the second and third pulley 62 and 64 may be integral. Moreover, the pulleys and belts could be substituted by wheels and wires or flexible links or any other similar type of transmission.

The mechanism in FIG. 7 further comprises a work tool actuator 114 mounted to a base 1a, which is rigidly fixed to the base 1 for example by a frame or truss (not shown). The work tool actuator 114, preferably of the rotary type, is operably linked to a work tool 82 that is rotatably connected to the end component 80 about a work tool axis G. Preferably, the work tool axis G is parallel to the central axis A, such that its inclination relative to the base remains fixed for all positions and orientations of the end component 80. In such a case, the mechanism in FIG. 7 provides SCARA mobility to an object supported by the work tool 82, as previously described. The operable link between the work tool actuator 114 and the work tool 82 has been achieved by an extensible shaft 112, for example a spline-shaft, which is capable of adjusting to the varying positions of the end component by changing its length. The extensible shaft 112 is connected to the moving portion of the actuator by a universal joint 111 and to the work tool 82 by a universal joint 113, so as to transmit the rotation of the work tool actuator 114 to the work tool 82.

Figure 21:
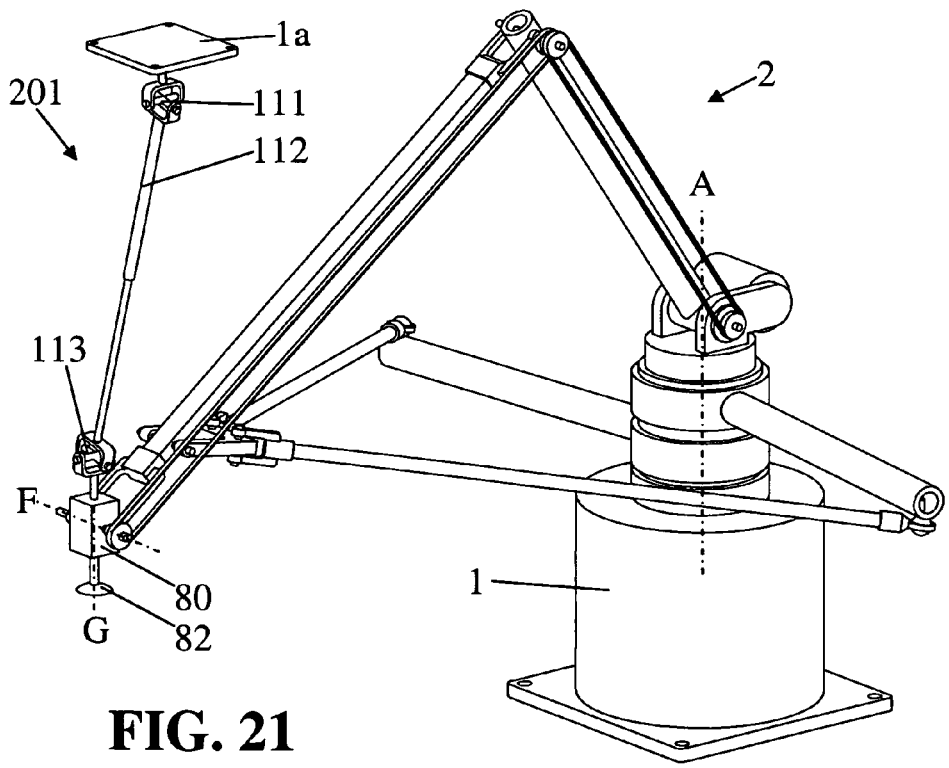
FIG. 21 is a perspective view of a mechanism similar to the embodiment of FIG. 1, the mechanism having alternative transmission means for retaining the orientation of a work tool with respect to the base.

As illustrated in FIG. 21, the universal joint 111 can also be mounted directly onto the base 1a, without the actuator 114 shown in FIG. 7. In such a case, the universal joint 111, the extensible shaft 112, and the universal joint 113 together represent transmission means 201 interposed between the base and the work tool that retain the orientation of the work tool 82 about its work tool axis G with respect to the base 1 and 1a. Therefore, the work tool 82 has three translational degrees of freedom relative to the base while its inclination and orientation is retained for all positions of the end component 80. A mechanism with such transmission means 201 can advantageously displace an object attached to the work tool 82 in parallel to itself, which is required by many industrial applications.

Referring back to FIG. 7, the mechanism also comprises an alternative movable connection between the forearms 34 and 44 of the first and second support arm 3 and 4 and the main arm 2. The connection is generally similar to the embodiment of FIG. 1, except that the intermediate member 90 is now connected to the forearm 16 of the main arm 2 by a revolute joint 92. The axis of rotation of revolute joint 92 is preferably parallel to the end axis F. The described alternative arrangement can be advantageous in situations where the end component 80 and its work tool 82 need to move into narrow spaces, for example.

Figure 8:
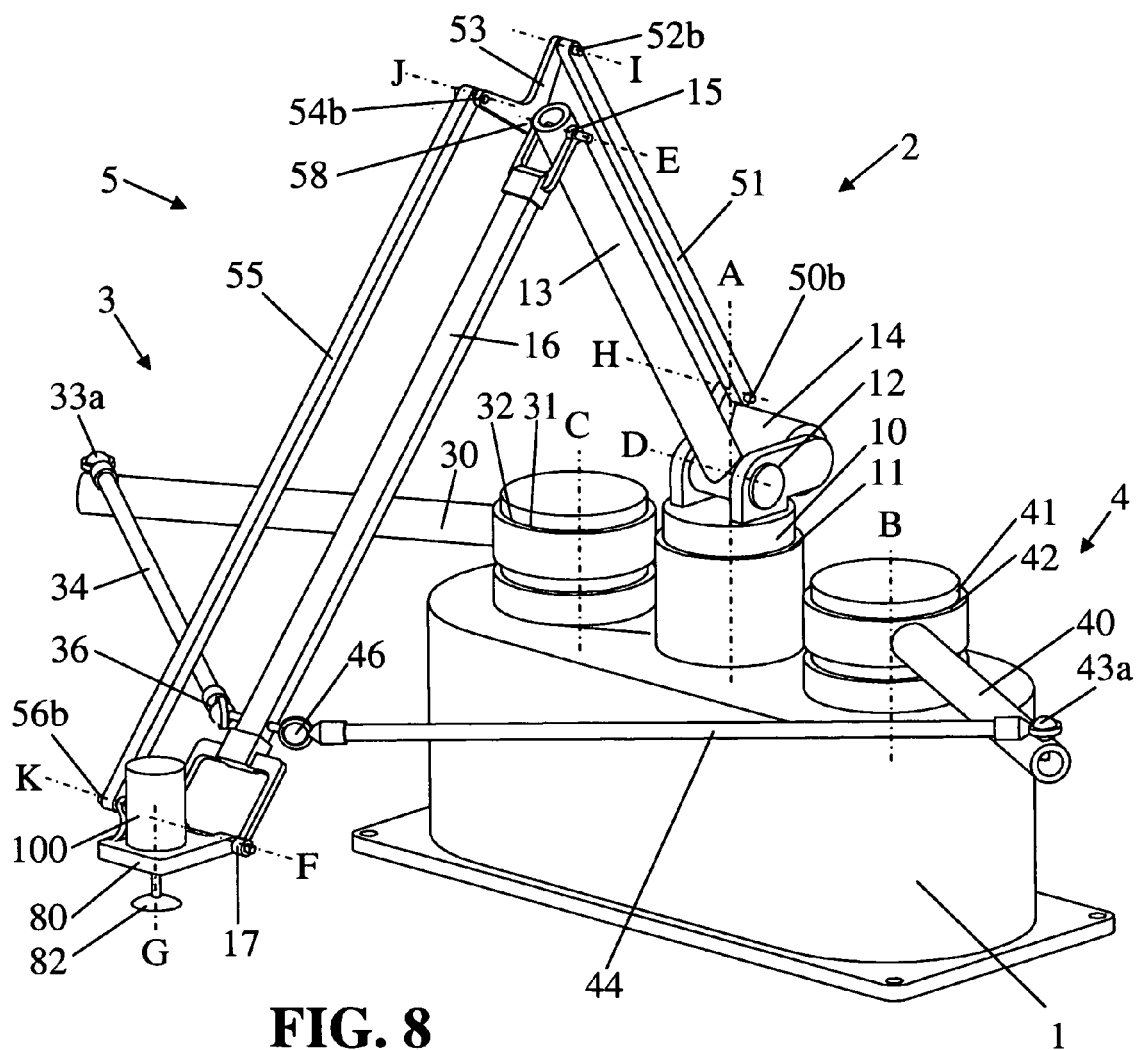
FIG. 8 is a perspective view of a mechanism similar to the embodiment of FIGS. 1 and 4, the mechanism having separate actuator axes and a motor for rotating a work tool to provide an additional rotational degree of freedom.

Referring now to FIG. 8, another parallel robot or mechanism constructed in accordance with teachings of the present invention, for positioning and orienting an object in space with four degrees of freedom and retained inclination is shown. The mechanism is generally similar to the embodiments of FIGS. 1 and 4, except that the mechanism is equipped with an alternative connection between the support arms and the main arm and an additional actuator mounted to the end component to rotationally drive a work tool. Moreover, the actuator axes of the support arms are no longer coincident with the central axis of the mechanism.

Figure 9:
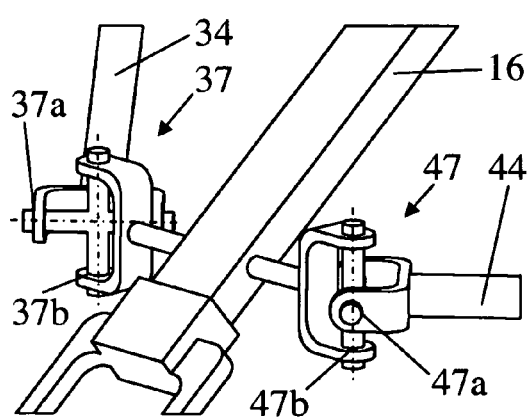
FIG. 9 is a perspective and detailed view of an alternative universal joint between the support arms and the main arm of the embodiment of FIG. 8.
Figure 10:
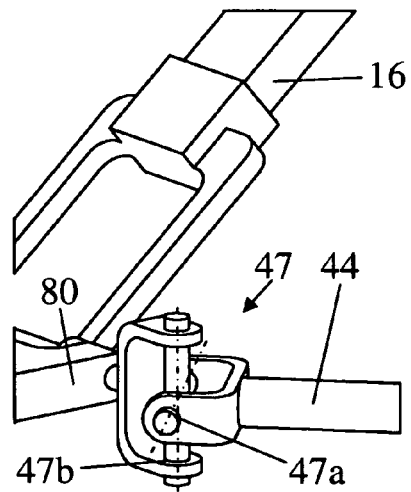
FIG. 10 is a perspective and detailed view of another alternative universal joint between the support arms and the main arm of the embodiment of FIG. 8.

More specifically, as illustrated in the embodiment of FIG. 8, the actuator arms 30 and 40 of the first and second support arm 3 and 4 are rotatably mounted to the base 1 by revolute joints 31 and 32 allowing rotation about respective actuator axes B and C, which are arranged in parallel to the central axis A. Such a parallel axis arrangement may be preferable to further simplify the overall design. Respective actuators 32 and 42 cause the actuator arms 30 and 40 to rotate relative to the base 1 about their actuator axes B and C. Moreover, the forearms 34 and 44 of the first and second support arms 3 and 4 are now connected to the forearm 16 of the main arm 2 by separate ball-and-socket joints 36 and 46. Alternatively, as shown in greater detail in FIG. 9, the forearms 34 and 44 may be connected to the forearm 16 of the main arm 2 by universal joints 37 and 47, each comprising a first and a second revolute joint 37a, 37b and 47a, 47b with intersecting axes of rotation. A further modification of the movable connection between the main arm 2 and the forearms 34 and 44 is illustrated in FIG. 10, where the forearm 44 of the second support arm 4 is connected to the end component 80 of the main arm 2 by a universal joint 47 comprising two revolute joints 47a and 47b with intersecting axes of rotation. The direct connection of the forearm 44 to the end component 80 by the universal joint 47 is particularly useful in combination with the embodiment of FIG. 2, since in such a case the forearm of a support arm does not require an independent rotational degree of freedom about its longitudinal axis. In other words, it is sufficient for the forearms 34 and 44 to be connected to both their actuator arms and the end component by respective joints that provide only two rotational degrees of freedom (for example, a universal joint).

Turning back to FIG. 8, the mechanism comprises a work tool actuator 100 mounted to the end component 80 and operably linked to a work tool 82 to rotationally drive the work tool 82 about a work tool axis G. The work tool 82 can be directly mounted on the moving portion of the work tool actuator 100, which may be of the rotary type. Alternatively, a transmission such as a gear box or pulleys and belts can be used to connect the moving portion of the work tool actuator 100 to the work tool 82. Preferably, the work tool axis G is parallel to the central axis A, such that its inclination relative to the base is retained for all positions and orientations of the end component 80. In such a case, the mechanism in FIG. 8 provides SCARA mobility to an object supported by the work tool 82, as previously discussed.

Figure 6:
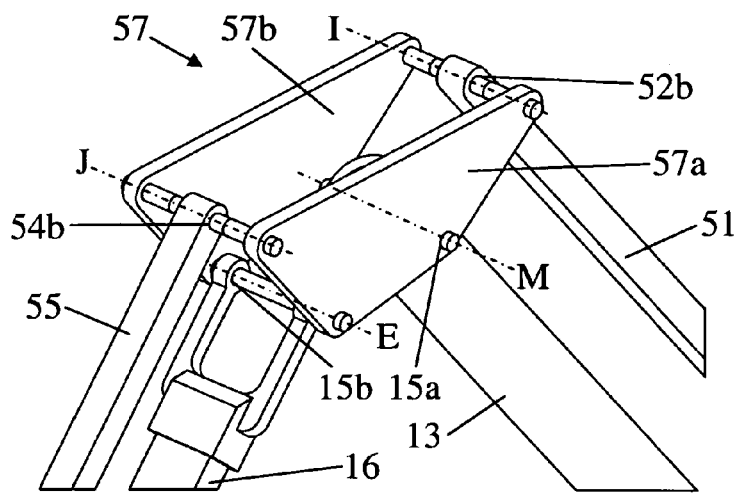
FIG. 6 is a perspective and detailed view of an alternative main arm as seen in the embodiment of FIG. 4.

Turning to FIG. 6, a detailed view of an alternative connection between the actuator arm 13 and the forearm 16 of the main arm 2 is shown. The alternative connection can be used in conjunction with the mechanism of FIG. 8 and other embodiments of this invention. As shown in FIG. 6, the connection is generally similar to previous embodiments except that the actuator arm 13 and the forearm 16 are now connected to a reference link 57 by separate revolute joints 15a and 15b allowing rotation about separate, but preferably parallel axes M and E. Thus, the actuator arm 13 and the forearm 16 are now indirectly connected via the reference link 57. As illustrated in previous embodiments, the first link 51 and the second link 55 are also connected to the reference link 57 by respective revolute joints 52b and 54b. The reference link 57 may include two reference link parts 57a and 57b.

Figures 11, 12:
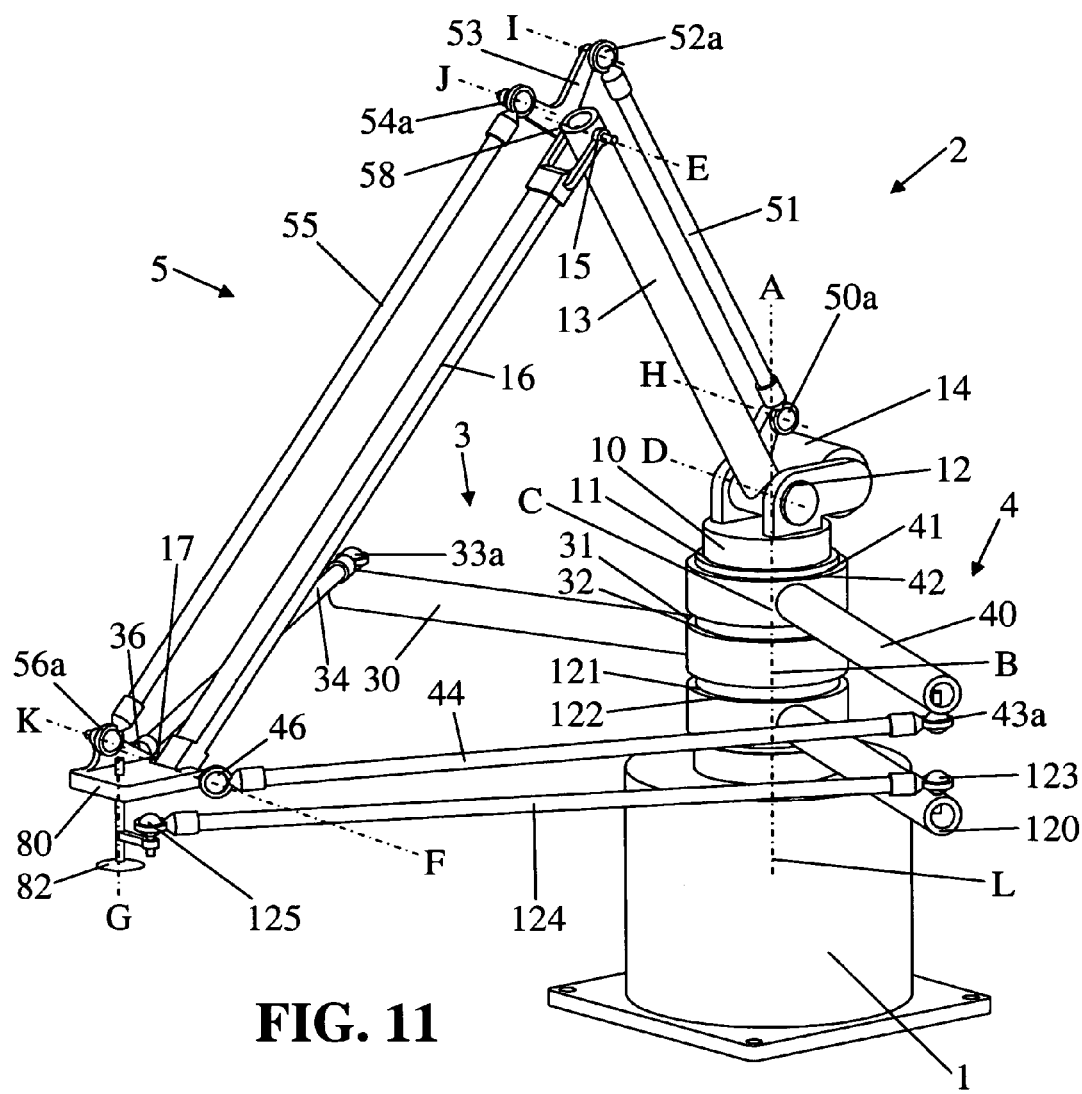
FIG. 11 is a perspective view of a mechanism similar to the embodiment of FIG. 1, the mechanism having an additional actuator arm and link for orienting a work tool to provide an additional rotational degree of freedom.
FIG. 12 is a perspective and detailed view of an alternative joint between the support arms and the main arm of the embodiment of FIG. 8.

Referring now to FIG. 11, another parallel robot or mechanism constructed in accordance with teachings of the present invention, for positioning and orienting an object in space with four degrees of freedom and retained inclination is shown. The mechanism is generally similar to the embodiment of FIG. 1, except that it is equipped with an alternative connection between the support arms and the main arm and an additional actuator arm and link to rotationally drive a work tool.

As illustrated in FIG. 11, the forearms 34 and 44 of the first and second support arm 3 and 4 are now connected to the end component 80 by ball-and-socket joints 36 and 46, whose pivot centers may lie on the end axis F. When used in combination with the ball-and-socket joints 33a and 43a, the forearms 34 and 44 gain an uncontrolled degree of freedom about their longitudinal axis, which, however, does not affect the functioning of the mechanism. To eliminate this degree of freedom, the ball-and-socket joints 33a and 43a can be replaced by universal joints as illustrated by the embodiment of FIG. 2.

The mechanism shown in FIG. 11 further comprises a work tool 82 rotatably mounted to the end component 80 about a work tool axis G, and a base-integrated work tool actuator 122 operably linked to the work tool 82 to rotationally drive the work tool relative to the end component 80. The operable link between the work tool actuator 122 and the work tool 82 has been realized by an elbow-linkage type mechanism, which comprises an actuator arm 120 and a link 124. The actuator arm 120 is rotatably mounted to the base 1 by a revolute joint 121 allowing rotation about an axis L, which may coincide with the central axis A. The position of the actuator arm 120 is influenced or controlled by the work tool actuator 122, which may be of a similar type as the actuators 32 and 42 described in conjunction with FIG. 1. Changes of the position of the actuator arm 120 are transmitted to the work tool 82 via the link 124, which is, on one end, connected to the actuator arm 120 by a ball-and-socket joint 123. On the other end, the link 124 is connected to the work tool 82 via a work tool-integral lever and a ball-and-socket joint 125, so as to rotate the work tool 82 about its work tool axis G upon changes in the position of the actuator arm 120. It should be understood that the ball-and-socket joints 123 and 125 can be replaced by universal joints. Moreover, the work tool 82 may include an amplification device such as a gear box (not shown) for amplifying the rotational motion induced by the link 124 to an object supported by the work tool.

The mechanism illustrated in FIG. 11 provides SCARA mobility to an object attached to the work tool 82. Since the work tool actuator 122, which influences the orientation of the work tool 82, is fixedly mounted to the base and does not add to the moving mass, the mechanism is capable of very high accelerations.

Referring to FIG. 12, yet another movable connection between the support arms 3 and 4 and the main arm 2 is shown. In the embodiment of FIG. 12, which can be used in conjunction with various mechanisms included in this invention, the forearms 34 and 44 of the support arms 3 and 4 are movably connected to the end component 80 of the main arm 2 via an alternative intermediate element 93, which has a cross-like shape. The forearms 34 and 44 are connected to the intermediate element 93 by respective revolute joints 35 and 45, whose axes of rotation coincide. The intermediate element 93 is further connected to the end component 80 by a revolute joint 94 allowing rotation about the end axis F. An advantage of the embodiment of FIG. 12 is the compact design. Moreover, since various revolute joints have the same axis of rotation, manufacturing of the parts is simplified.

Figure 13:
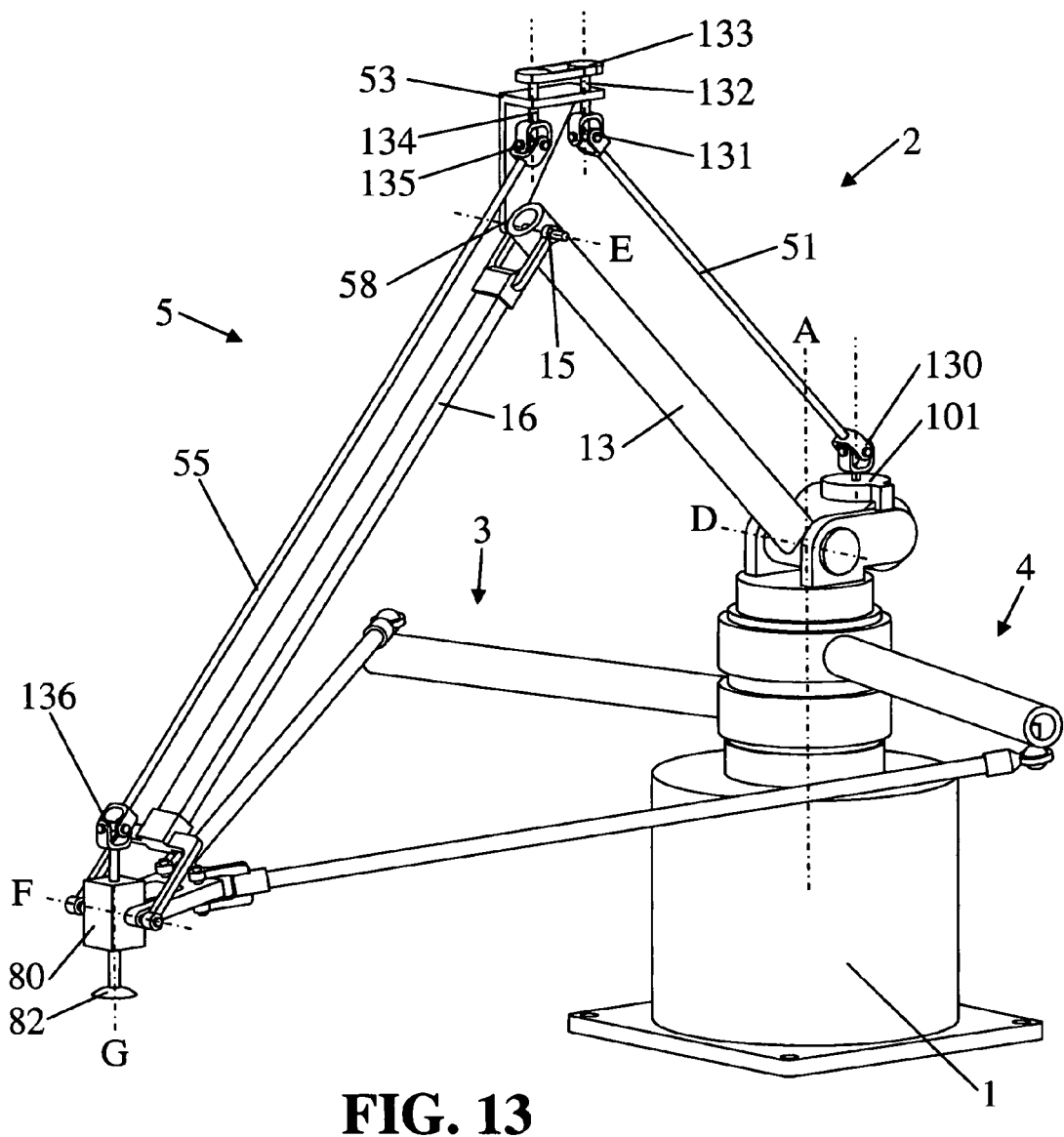
FIG. 13 is a perspective view of a mechanism similar to the embodiment of FIG. 1, the mechanism having an alternative main arm and an additional actuator for rotating a work tool to provide an additional rotational degree of freedom.

Referring now to FIG. 13, another parallel robot or mechanism constructed in accordance with teachings of the present invention, for positioning and orienting an object in space with four degrees of freedom and retained inclination is shown. The mechanism is similar to the embodiment of FIG. 4, except that the linkage means 5 have some elements serving a dual purpose, i.e. they both retain the inclination of the end component and rotate the work tool about a work tool axis. Such a functional integration may simplify the design and reduces the moving mass.

As illustrated in FIG. 13, the mechanism is equipped with a work tool actuator 101 mounted to the platform 10 by its fixed portion to rotationally drive the work tool 82 about the work tool axis G via a drive shaft assembly, which utilizes the first and second link 51 and 55. On one end, the first link 51 is connected to the rotating portion of the work tool actuator 101 by a universal joint 130. On its other end, it is connected to a first shaft 132 by a universal joint 131. Rotational motion of the first shaft 132 is transmitted by a transmission 133 to a second shaft 134, which is arranged in parallel to the first shaft 132. The transmission 133 may comprise a belt-and-pulley arrangement, as shown in FIG. 13, or gears for example. The second shaft 135 is further connected to the second link 55 by universal joint 135, and the second link is connected to the work tool 82 by a universal joint 136. Rotation from the work tool actuator 101 is thus transmitted to the work tool 82.

The described arrangement also serves the purpose of retaining the inclination of the end component 80 relative to the platform 10, as it represents a planar mechanism that comprises two parallelograms linked to each other, as previously discussed. More specifically, as shown in FIG. 13, the first link 51 ideally has the same length as the actuator arm 13 and is arranged in parallel thereto. Similarly, the second link 55 has the same length as the forearm 16 and is arranged in parallel thereto. Moreover, the first and second shaft 132 and 134 are rotatably mounted to the reference link 53, so as to be free to rotate about their longitudinal axes relative to the reference link 53. Therefore, the position of the pivot points of the two universal joints 131 and 135 is fixed with respect to the reference link 53. Similarly, the pivot point of the universal joint 130 has a fixed position relative to the platform 10, and so does the pivot point of the universal joint 136 relative to the end component 80. Preferably, the pivot points of the four universal joints lie in a plane normal to the main actuator axis D, the forearm axis E, and the end axis F. Thus, the pivot points of the universal joints 130 and 131 along with the axes D and E represent the corners of the first parallelogram, while the pivot points of the universal joints 135 and 136 along with the axes E and F represent the corners of the second parallelogram.

Figure 20:
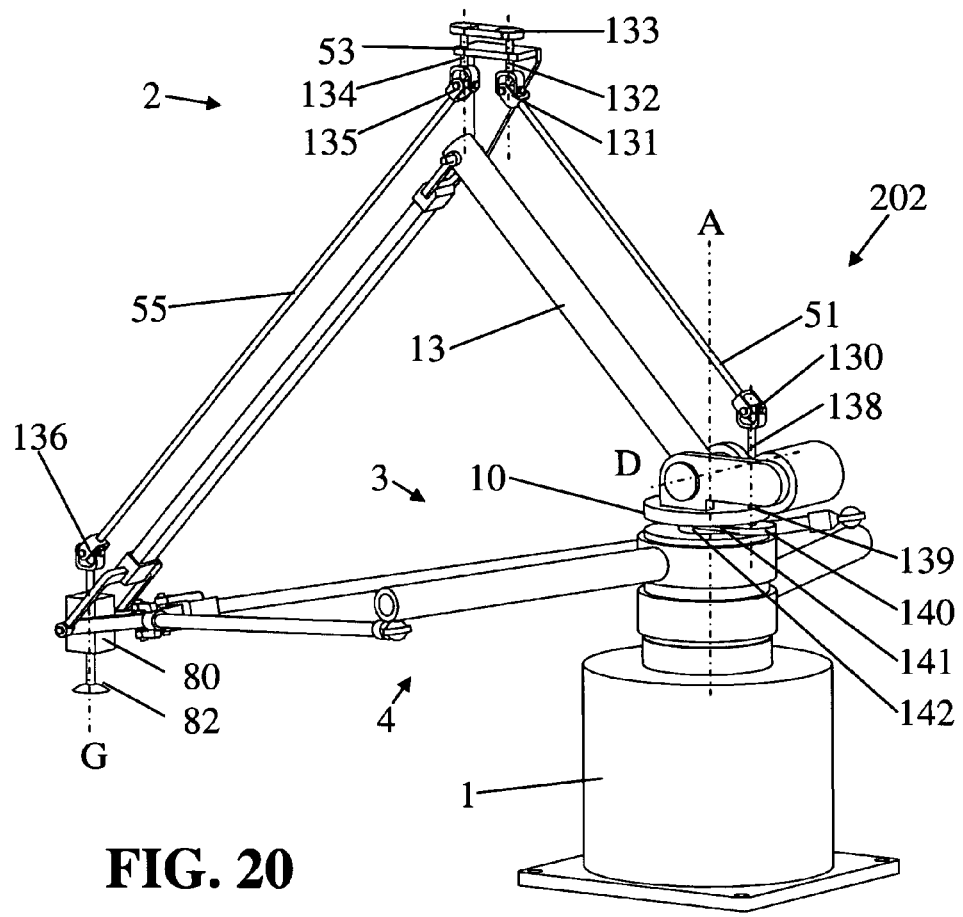
FIG. 20 is a perspective view of a mechanism similar to the embodiment of FIG. 1, the mechanism having transmission means for retaining the orientation of a work tool with respect to the base.

Referring to FIG. 20, a mechanism for positioning an object with three translational degrees of freedom is shown. The mechanism is similar to the one illustrated in the embodiment of FIG. 13, except that it is equipped with passive transmission means 202, rather than an actuator 101, which retain the orientation of the work tool 82 about its work tool axis G relative to the base. The transmission means 202 are interposed between the work tool 82 and the base 1, as will be described. As shown in FIG. 20, the universal joint 130 is connected to a shaft 138 that is rotatably mounted to the platform 10 by a revolute joint 139. The shaft 138 has a first pulley 140, which is linked to a second pulley 142, preferably of similar diameter, by a belt 141. The second pulley 142 is rigidly mounted to the base 1, such that a rotational motion of the platform 10 about the central axis A causes the shaft 138 to rotate relative to the platform 10, but retain its orientation relative to the base. The rotation is further transmitted to the work tool 82 via the first and second link 51 and 55, as previously described in conjunction with the embodiment of FIG. 13. Thus, the transmission means 202, which include the entire drive shaft assembly and components 138-143, retain the orientation of the work tool 82 about the work tool axis G relative to the base 1 for all positions of the end component 80. Included in the concept are alternative designs of the transmission means 202. For example, the actuator arm 13 and its main actuator axis D could be offset radially, allowing for the shaft 138 to be directly connected to the base 1. In such a case, the shaft 138 would be aligned with the central axis A of the mechanism.

Figure 16:
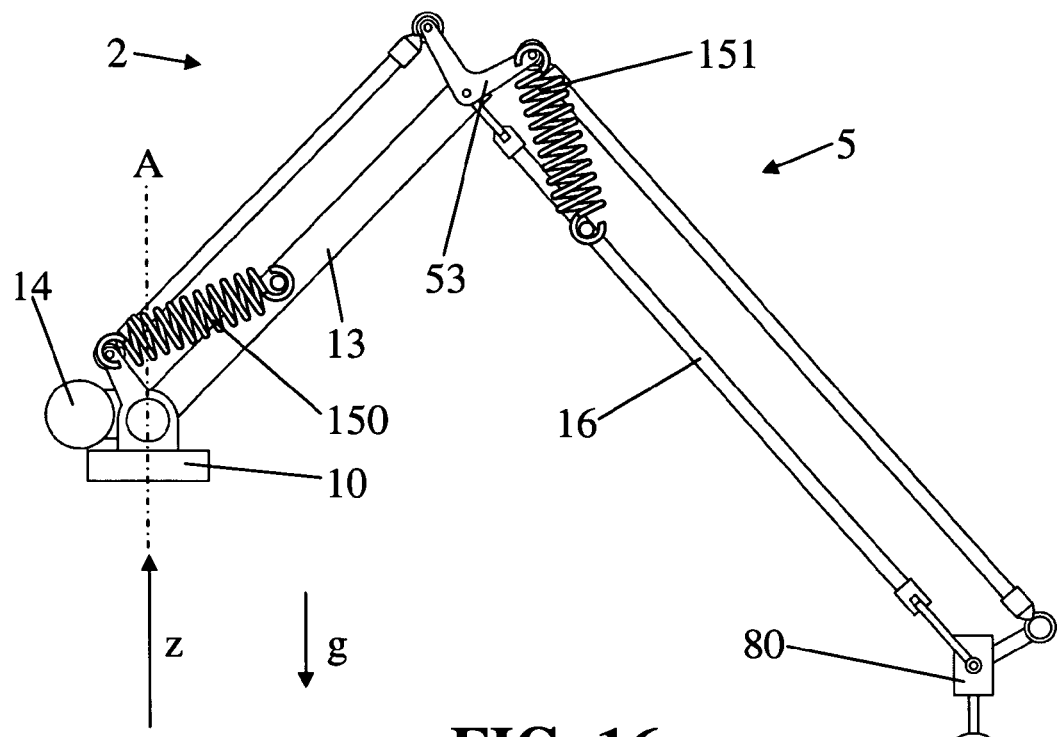
FIG. 16 is a detailed side view of the mechanism shown in the embodiment of FIG. 1, the mechanism comprising elastic means for static balancing.
Figure 17:
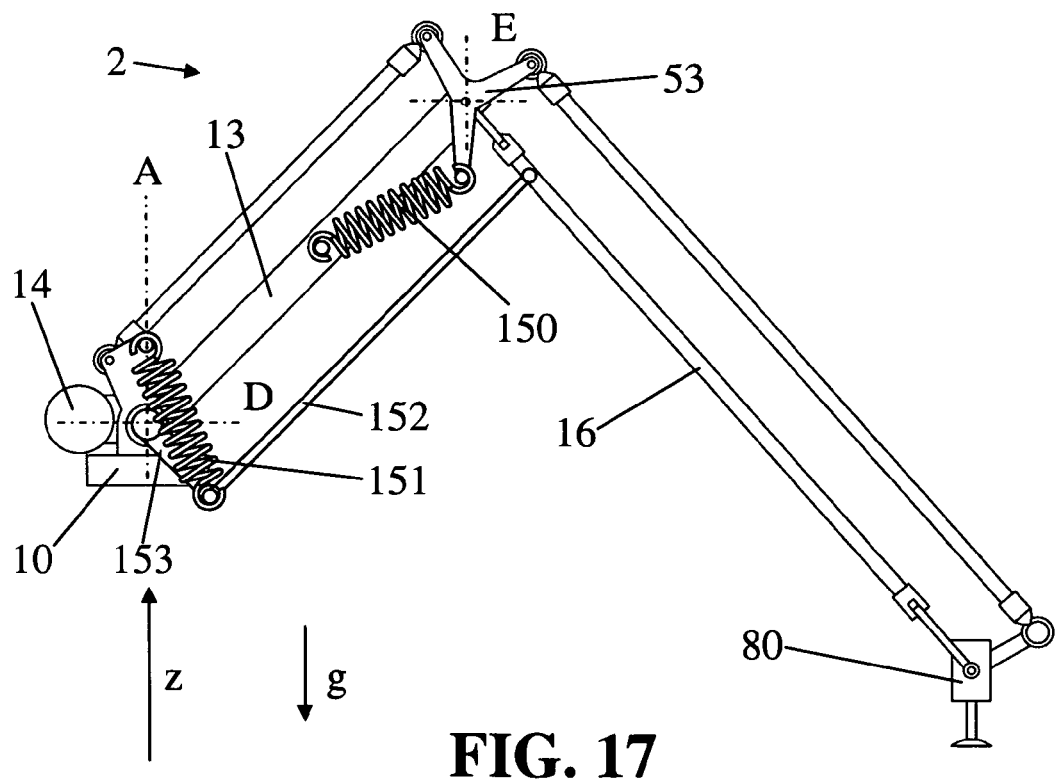
FIG. 17 is a detailed side view of the mechanism shown in the embodiment of FIG. 1, the mechanism comprising alternative elastic means for static balancing.

FIGS. 16 and 17 show a side view of the main arm of the embodiment of FIG. 1, where the main arm comprises additional elastic means for statically balancing the mechanism. The purpose of the elastic means is to prevent the robot from collapsing under the influence of gravity under static conditions, such that the robot can be positioned manually by an operator without any actuators or brakes engaged. In mechanisms according to this invention, gravity generally urges the forearm 16 of the main arm 2 to assume a vertical position like a pendulum, provided that gravitational forces point in the negative z-direction as illustrated in FIGS. 16 and 17. Moreover, gravity also causes the actuator arm 13 of the main arm 2 to rotate downwards. In such a case, it is possible to equip both the actuator arm 13 and the forearm 16 of the main arm 2 with elastic means, which reduce or balance out the influence of gravity.

As illustrated in FIG. 16, the main arm 2 is equipped with elastic means comprising a first and a second spring 150 and 151. The first spring 150 is interposed between the actuator arm 13 and the platform 10, counteracting or reducing the influence of gravity on the actuator arm 13, while the second spring 151 is interposed between the forearm 16 and the reference link 53, counteracting or reducing the influence of gravity on the forearm. It should be understood, that the springs could be of any type, such as tension, compression, or torsion, and can also be coupled with motion dampening devices in parallel. Moreover, instead of springs, other elastic means such as air cylinders or rubber elements can be used as well as any other type of flexible link that is capable of producing a gravity-compensating force or torque when interposed between two parts that move relative to each other, such as the actuator arm 13 and the platform 10, for example.

The springs 150 and 151 may not fully compensate for gravitational forces acting on the mechanism, because in practice, other force components such as friction in the actuators or joints also act against the influence of gravity under static conditions. In such a case, the end component 80 will remain static even if the springs compensate for only part of the gravitational forces. Moreover, in certain applications it might be sufficient to statically balance the mechanism for only one position and orientation of the end component 80.

FIG. 17 shows the main arm of the embodiment of FIG. 1 with an alternative implementation of the elastic means. Similar to the embodiment of FIG. 16, the elastic means comprise two springs 150 and 151. The spring 150 is now interposed between the actuator arm 13 and the reference link 53. To statically balance the forearm 16 of the mechanism, an additional linkage is used. The additional linkage comprises a lever 153 rotatably connected to the platform 10 about the main actuator axis D, and a link 152 that is pivotably connected to both the lever 153 and the forearm 16. The link 152 transmits the angular position of the forearm 16 to the lever 153. A spring 151 is interposed between the lever 153 and the platform 10, such that it produces a torque on the lever depending on its angular position. The torque is transmitted to the forearm 16 via the link 152, thus compensating for the influence of gravity on the forearm 16. It should be understood that the individual balancing arrangements of the actuator arm 13 and the forearm 16 shown in the embodiments of FIGS. 16 and 17 are interchangeable.

Figure 18:
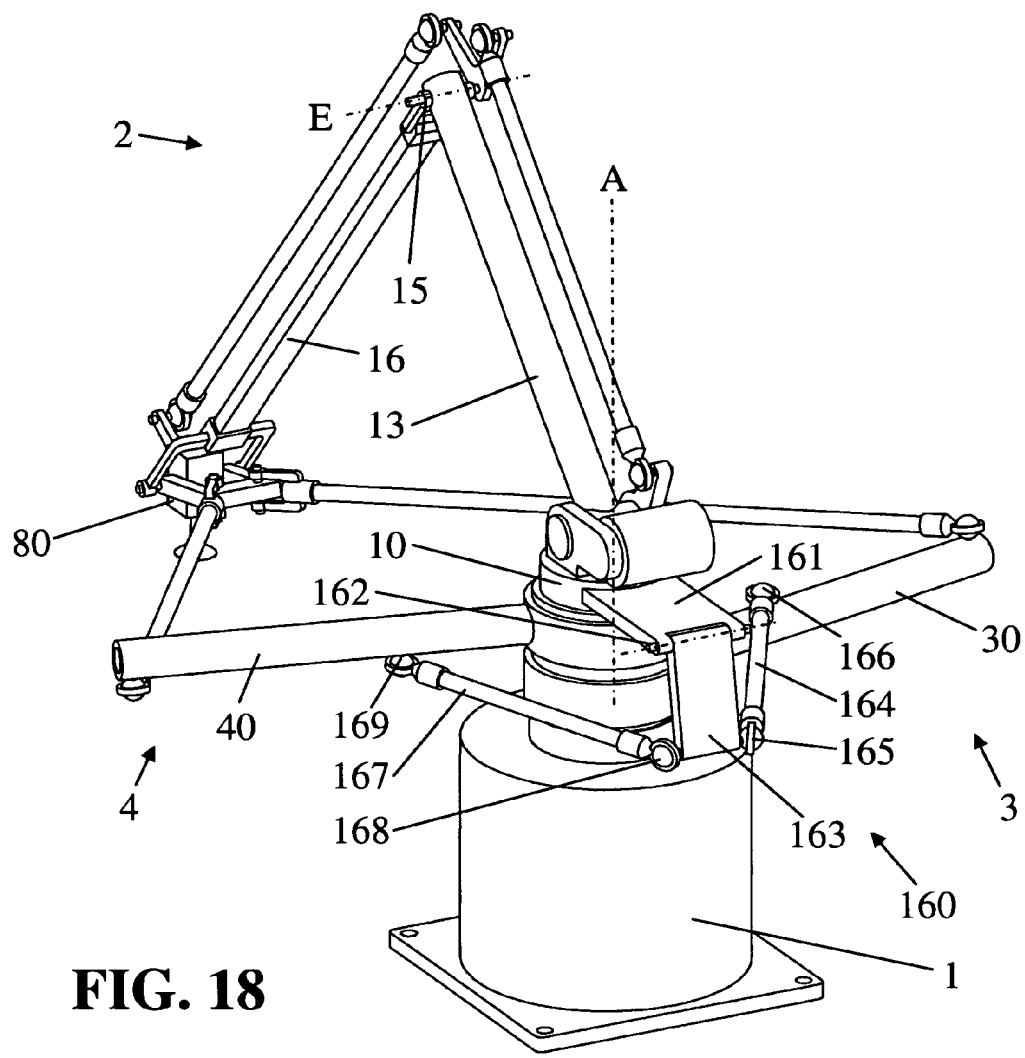
FIG. 18 is a perspective view of the mechanism shown in the embodiment of FIG. 1, the mechanism having an additional guiding linkage interposed between the main arm and the two support arms.

Referring now to FIG. 18, another parallel robot or mechanism constructed in accordance with teachings of the present invention, for positioning and orienting an object in space with three degrees of freedom and retained inclination is shown. The mechanism is generally similar to the embodiment of FIG. 1, except that it is equipped with an additional guiding linkage 160 interposed between the main arm 2 and the two support arms 3 and 4 to keep the main arm 2 at a substantially equal angular distance to the two support arms. The guiding linkage 160 can reduce the stress on the main arm 2, since it is no longer subject to the bending load caused by the rotational inertia of the platform 10 and other components mounted thereto during rotations of the main arm 2 about the central axis A.

As illustrated in FIG. 18, the guiding linkage 160 includes a first portion 161 rigidly connected to the platform 10, and a second portion 163 rotatably connected to the first portion 161 by a revolute joint 162. The second portion 163 is further pivotably connected to a first and a second guiding link 164 and 167 by respective ball-and-socket joints 165 and 168. The first and second guiding link 164 and 167 further connect to a respective actuator arm 30 and 40 of the support arms 3 and 4 by ball-and-socket joints 166 and 169. As will be apparent to those skilled in the art, one of the two ball-and-socket joints of a respective guiding link could be replaced by a universal joint. Preferably, the guiding links 164 and 167 are of equal length, and the first and second portions 161 and 163 are radially aligned with the actuator arm 13 of the main arm 2. In such a symmetric design, the main arm 2 will be kept midway between the two support arms 3 and 4. Upon changes in the angular position of the actuator arms 30 or 40, the guiding linkage 160 urges the main arm 2 to rotate about the central axis A such that the actuator arms of the support arms 3 and 4 remain at substantially equal angular distance from the main arm. Included in the concept of this invention are various alternative designs of the guiding linkage. For example, the guiding linkage may comprise three links pivotably connected to each other on one end, and pivotably connected to a respective one of the actuator arms 13, 30, and 40.

Figure 19:
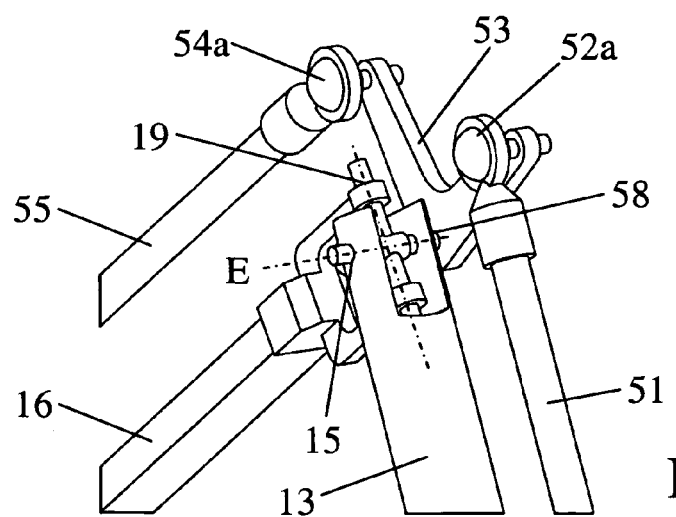
FIG. 19 is a perspective and detailed view of a universal joint that can be used in the main arm of the embodiment of FIG. 18.

When a guiding linkage is used, the revolute joint 15 between the actuator arm 13 and the forearm 16 may be replaced by a universal joint. As illustrated in FIG. 19 in greater detail, the universal joint includes a first revolute joint 15 allowing the forearm 16 to rotate relative to the actuator arm 13 about the forearm axis E. Moreover, the universal joint comprises a second revolute joint 19, which allows the forearm 16 to pivot sideways with respect to the actuator arm. The replacement by a universal joint is possible since the guiding linkage keeps the main arm midway between the support arms 3 and 4.

Although the invention has been described herein in connection with various preferred embodiments, there is no intention to limit the invention to those embodiments. It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A mechanism for positioning and orienting an object in space with at least three degrees of freedom, the mechanism comprising:
   a base;
   a main arm, said main arm comprising a platform rotatably mounted to said base and allowed to rotate about a central axis, an end component for supporting said object, linkage means interposed between said platform and said end component, said linkage means allowing said end component two and only two translational degrees of freedom with respect to said platform and retaining the inclination of said end component with respect to said central axis for all positions and orientations of said end component, and an actuator for influencing one of said translational degrees of freedom of said end component; and
   a first and a second support arm, each of said first and second support arm comprising an actuator arm rotatably connected to said base, an actuator for rotating said actuator arm relative to said base about a respective first and second actuator axis, and a forearm movably connected to said actuator arm, wherein the forearms of said first and said second support arm are movably connected to said main arm and capable of fully supporting said main arm and said end component, so that said first and said second support arm influence the position and orientation of said end component.

2. A mechanism according to claim 1, wherein said linkage means comprise an actuator arm rotatably connected to said platform and actuated by the actuator of said main arm relative to said platform about a main actuator axis, a forearm movably connected to said actuator arm with at least one rotational degree of freedom about a forearm axis, said forearm further being movably connected to said end component with at least one rotational degree of freedom about an end axis.

3. A mechanism according to claim 2, wherein said main actuator axis is substantially perpendicular to said central axis and substantially parallel to said forearm axis and said end axis for all positions and orientations of said end component.

4. A mechanism according to claim 2, wherein said linkage means further comprise a reference link rotatably connected to the actuator arm of said main arm about said forearm axis, a first link movably connected to each of said platform and said reference link, said first link being of equal length as the actuator arm of said main arm and offset in parallel thereto; and a second link movably connected to each of said reference link and said end component, said second link being of equal length as the forearm of said main arm and offset in parallel Thereto.

5. A mechanism according to claim 1, wherein said linkage means comprise:
   a reference link;
   an actuator arm rotatably connected to each of said platform and said reference link on opposing ends, wherein said actuator arm is actuated by the actuator of said main arm relative to said platform about a main actuator axis;
   a first link movably connected to each of said platform and said reference link on opposing ends, said first link being of equal length as the actuator arm of said main arm and offset in parallel thereto;
   a forearm rotatably connected to each of said reference link and said end component on opposing ends; and
   a second link movably connected to each of said reference link and said end component on opposing ends, said second link being of equal length as the forearm of said main arm and offset in parallel thereto.

6. A mechanism according to claim 1, wherein said first and said second actuator axis are substantially parallel to said central axis.

7. A mechanism according to claim 1, wherein said first and said second actuator axis are substantially coincident with said central axis.

8. A mechanism according to claim 1, wherein the forearm of at least one of said first and said second support arm is connected to the respective actuator arm by at least two revolute joints in series, said revolute joints having mutually non-parallel and intersecting axes of rotation.

9. A mechanism according to claim 1, wherein the forearm of at least one of said first and said second support arm is connected to said main arm by at least two revolute joints in series, said revolute joints having mutually non-parallel and intersecting axes of rotation.

10. A mechanism according to claim 1, wherein the forearm of at least one of said first and said second support arm is movably connected to the end component.

11. A mechanism according to claim 2, wherein the forearm of at least one of said first and said second support arm is movably connected to the forearm of said main arm.

12. A mechanism according to claim 1, further comprising an intermediate link for movably connecting the forearms of said first and said second support arm to said main arm, said intermediate link being rotatably connected to each of the forearms of said first and said second support arm, said intermediate link being further rotatably connected to said main arm.

13. A mechanism according to claim 1, further comprising a work tool movably mounted to said end component and a work tool actuator mounted to said end component and operably linked to said work tool, said work tool actuator driving said work tool to move relative to said end component.

14. A mechanism according to claim 2, further comprising elastic means for statically balancing said mechanism, said elastic means comprising at least a first spring interposed between said platform and said actuator arm of said main arm, wherein said elastic means compensate gravitational forces acting on the actuators of said main arm and said first and said second support arm for at least one position and orientation of said end component.

15. A method of moving an object in space with at least three degrees of freedom and retained inclination, comprising:

provinding a mechanism, said mechanism including a base, a main arm comprising an end component for supporting said object and an actuator for actuating said main arm, said main arm being rotatably mounted to said base about a central axis, said mechanism further including a first and a second support arm comprising an actuator for actuating the respective support arm, each of said first and second support arm being interposed between said base and said main arm, actuating said main arm and said first and second support arm with the respective actuator to influence the position and orientation of said end component relative to said base; and retaining the inclination of said end component with respect to said central axis with said main arm and only said main arm, wherein said main arm further comprises a platform rotatably mounted to said base and allowed to rotate about said central axis and linkage means interposed between said platform and said end component said linkage means allowing said end component two and only two translational degrees of freedom with respect to said platform and retaining the inclination of said end component with respect to said central axis, and wherein each of said first and second support arm comprises an actuator arm rotatably connected to said base and actuated by said actuator relative to said base, and a forearm movably connected to said actuator arm, wherein the forearms of said first and said second support arm are movably connected to said main arm and capable of fully supporting said main arm and said end component.

\* \* \* \* \*